(12) United States Patent
Opshaug et al.

(10) Patent No.: US 11,563,538 B2
(45) Date of Patent: Jan. 24, 2023

(54) SIGNAL STRUCTURE FOR TERRESTRIAL TIMING AND POSITIONING SYSTEM

(71) Applicant: QUALCOMM Incorporated, San Diego, CA (US)

(72) Inventors: Guttorm Ringstad Opshaug, Redwood City, CA (US); Mangesh Chansarkar, Irvine, CA (US); David Tuck, San Juan Capistrano, CA (US); Jordan Cookman, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 17/098,890

(22) Filed: Nov. 16, 2020

(65) Prior Publication Data

US 2021/0288772 A1    Sep. 16, 2021

Related U.S. Application Data

(60) Provisional application No. 62/988,243, filed on Mar. 11, 2020.

(51) Int. Cl.
*H04L 5/00*        (2006.01)
*H04W 72/00*    (2009.01)
(Continued)

(52) U.S. Cl.
CPC ........ *H04L 5/0048* (2013.01); *H04L 27/2601* (2013.01); *H04W 72/005* (2013.01); *H04W 72/0453* (2013.01)

(58) Field of Classification Search
None
See application file for complete search history.

(56) References Cited

U.S. PATENT DOCUMENTS

2010/0195566 A1    8/2010    Krishnamurthy et al.
2010/0260154 A1    10/2010    Frank et al.
(Continued)

FOREIGN PATENT DOCUMENTS

WO    WO-2020145873 A1 *    7/2020    ........... G01S 1/0428

OTHER PUBLICATIONS

Huawei: "DL and UL Reference Signals for NR Positioning", 3GPP Draft; 3GPP TSG RAN WG1 Meeting #96bis, R1-1904004, 3rd Generation Partnership Project (3GPP), Mobile Competence Centre; 650, Route Des Lucioles; F-06921 Sophia-Antipolis Cedex; France, vol. RAN WG1, No. Xi'an, China; Apr. 8, 2019-Apr. 12, 2019, Apr. 2, 2019 (Apr. 2, 2019), XP051707080, 13 Pages, Retrieved from the Internet: URL: http://www.3gpp.org/ftp/tsg%5Fran/WG1%5FRL1/TSGR1%5F96b/Docs/R1%2D1904004%ZEzip [retrieved on Apr. 2, 2019], The whole document, Section 1, paragraph [02.3]—paragraph [02.4], p. 3.

(Continued)

*Primary Examiner* — Diane L Lo
(74) *Attorney, Agent, or Firm* — Weaver Austin Villeneuve & Sampson LLP

(57) ABSTRACT

Embodiments herein provide for a Low-Frequency (LF) broadcast system that improves on the LORAN-C system to help optimize the use of available spectrum while modernizing the signal structure of broadcast signals. In particular, embodiments can utilize an Orthogonal Frequency Division Multiplexing (OFDM) signal structure to broadcast timing and data signals in successive symbols of an OFDM resource block. Signals can include, for example, comb-1, comb-2, or comb-3 signal structures. Other signal aspects such as muting schemes, modulation, frequency offsets, and the like may vary, depending on desired functionality.

30 Claims, 12 Drawing Sheets

(51) Int. Cl.
  *H04W 72/04* (2009.01)
  *H04L 27/26* (2006.01)

(56) References Cited

U.S. PATENT DOCUMENTS

2017/0289965 A1* 10/2017 You .................... H04W 72/042
2020/0052845 A1*  2/2020 Chuang .............. H04W 72/042
2021/0076359 A1*  3/2021 Sosnin ................. H04W 72/10

OTHER PUBLICATIONS

International Search Report and Written Opinion—PCT/US2021/021533—ISA/EPO—dated Jun. 10., 2021.

* cited by examiner

| ID\SF | 0 | 1 | 2 | 3 | 4 | 5 | 6 | 7 | 8 | 9 |
|---|---|---|---|---|---|---|---|---|---|---|
| 0-5 | 0 | 1 | 2 | 3 | 4 | 0 | 1 | 2 | 3 | 4 |
| 6-11 | 0 | 1 | 2 | 3 | 3 | 0 | 1 | 2 | 3 | 3 |
| 12-17 | 0 | 1 | 2 | 2 | 3 | 0 | 1 | 2 | 2 | 3 |
| 18-23 | 0 | 1 | 1 | 2 | 2 | 0 | 1 | 1 | 2 | 2 |
| 24-29 | 0 | 1 | 1 | 1 | 2 | 0 | 1 | 1 | 1 | 2 |
| 30-35 | 0 | 0 | 5 | 4 | 3 | 0 | 0 | 5 | 4 | 3 |
| 36-41 | 0 | 0 | 5 | 4 | 4 | 0 | 0 | 5 | 4 | 4 |
| 42-47 | 0 | 0 | 5 | 5 | 4 | 0 | 0 | 5 | 5 | 4 |
| 48-53 | 0 | 0 | 0 | 5 | 5 | 0 | 0 | 0 | 5 | 5 |
| 54-59 | 0 | 0 | 0 | 0 | 5 | 0 | 0 | 0 | 0 | 5 |

FIG. 9

SIGNAL STRUCTURE FOR TERRESTRIAL TIMING AND POSITIONING SYSTEM

RELATED APPLICATIONS

This application claims the benefit of U.S. Provisional Application No. 62/988,243, filed Mar. 11, 2020, entitled "Improved Signal Structure For 100 KHz Broadcast Systems," which is assigned to the assignee hereof and incorporated by reference herein in its entirety.

BACKGROUND

1. Field of Invention

The present invention relates generally to the field of terrestrial positioning, and more specifically to the use of wireless signals broadcast from terrestrial transmitters to determine the location of a receiver.

2. Description of Related Art

LORAN-C is a type of LORAN (LOng-RAnge Navigation) system used in past decades by many countries to provide terrestrial-based hyperbolic radio navigation for air and marine navigation. Using timing reference signals broadcast from various transmitters, mariners and aviators could determine their location to within an accuracy of hundreds of feet. With the rise of Global Navigation Satellite Systems (GNSS), such as Global Positioning System (GPS), LORAN-C eventually became obsolete. Many countries, including the United States, have recently shut down their LORAN-C systems.

BRIEF SUMMARY

Embodiments herein provide for a Low-Frequency (LF) broadcast system that improves on the LORAN-C system to help optimize the use of available spectrum while modernizing the signal structure of timing reference signals and allowing for data communication. In particular, embodiments can utilize an Orthogonal Frequency Division Multiplexing (OFDM) signal structure to broadcast timing reference signals and data signals in successive symbols of an OFDM resource block. Signals can include, for example, comb-1, comb-2, or comb-3 signal structures. Other signal aspects such as muting schemes, modulation, frequency offsets, and the like may vary, depending on desired functionality. Such a modernized broadcast system would be capable of providing timing and navigation should GNSS systems fail.

An example method of transmitting wireless RF timing reference signals from a broadcast station, according to this disclosure, comprises transmitting a timing reference signal using one or more subcarriers during one or more symbols of a first set of OFDM resource blocks occurring at a first subframe, wherein each OFDM resource block of the first set of OFDM resource blocks comprises a set of adjacent subcarriers and a series of successive symbols. The method further includes, for each symbol of the one or more symbols in which the timing reference signal is transmitted, transmitting data in at least one of the one or more subcarriers in a symbol successive to the respective symbol in which the timing reference signal was transmitted.

An example method of using wireless RF timing reference signals at a receiver, according to this disclosure, comprises receiving timing reference signals and data transmitted from one or more broadcast stations, wherein, for each of the one or more broadcast stations, a respective timing reference signal is received during one or more symbols of a respective set of OFDM resource blocks, wherein each OFDM resource block of the respective set of OFDM resource blocks comprises a respective set of adjacent subcarriers and a respective series of successive symbols, and respective data is received in a symbol successive to each symbol of the one or more symbols in which the respective timing reference signal is transmitted. The method further comprises obtaining information regarding each of the one or more broadcast stations based on the respective timing reference signal or the respective data transmitted by each broadcast station, and performing either or both of the following operations (i) determining a clock offset of the receiver based at least in part on the respective timing reference signal and the obtained information regarding at least one of the one or more broadcast stations, or (ii) determining a location of the receiver based at least in part on the respective timing reference signal and obtained information regarding each of the one or more broadcast stations.

An example broadcast station for transmitting wireless RF timing reference signals, according to this disclosure, comprises a wireless communications interface, a memory, and one or more processing units communicatively coupled with the wireless communications interface and the memory. The one or more processing units are configured to perform functions including transmitting a timing reference signal, via the wireless communications interface, using one or more subcarriers during one or more symbols of a first set of OFDM resource blocks occurring at a first subframe, wherein each OFDM resource block of the first set of OFDM resource blocks comprises a set of adjacent subcarriers and a series of successive symbols. The one or more processing units are also configured to, for each symbol of the one or more symbols in which the timing reference signal is transmitted, transmit data, via the wireless communications interface, in at least one of the one or more subcarriers in a symbol successive to the respective symbol in which the timing reference signal was transmitted.

An example receiver configured to use wireless RF timing reference signals, according to this disclosure, comprises a wireless communications interface, a memory, and one or more processing units communicatively coupled with the wireless communications interface and the memory. The one or more processing units are configured to perform functions comprising receiving, via the wireless communications interface, timing reference signals and data transmitted from one or more broadcast stations, wherein, for each of the one or more broadcast stations a respective timing reference signal is received during one or more symbols of a respective set of OFDM resource blocks, wherein each OFDM resource block of the respective set of OFDM resource blocks comprises a respective set of adjacent subcarriers and a respective series of successive symbols, and respective data is received in a symbol successive to each symbol of the one or more symbols in which the respective timing reference signal is transmitted. The one or more processing units are further configured to perform functions comprising obtaining information regarding each of the one or more broadcast stations based on the respective timing reference signal or the respective data transmitted by each broadcast station, and performing either or both of the following operations: (i) determining a clock offset of the receiver based at least in part on the respective timing reference signal and the obtained information regarding at least one of the one or more broadcast stations, or (ii) determining a location of the receiver based at least in part on the respective timing reference signal and obtained information regarding each of the one or more broadcast stations.

BRIEF DESCRIPTION OF THE DRAWINGS

FIG. 9 is a table that illustrates how a broadcast system may implement v-shift hopping, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

As used herein, the terms "location" and "position" are used synonymously. Moreover, the terms "location estimate", "estimated location", "location", "position", "position estimate", "position fix", "estimated position", "location fix" or "fix" may be used to describe a determined or estimated location of the receiver. This determination may comprise an absolute location (e.g., a latitude and longitude and possibly altitude) or a relative location (e.g., a location expressed as distances north or south, east or west and possibly above or below some other known fixed location or some other location such as a location for the receiver at some known previous time). A location may also be specified as a geodetic location (e.g., a latitude and longitude). A location may further include an uncertainty or error indication, such as a horizontal and possibly vertical distance by which the location is expected to be in error or an indication of an area or volume (e.g. a circle or ellipse) within which the receiver is expected to be located with some level of confidence (e.g. 95% confidence).

Figure 1:
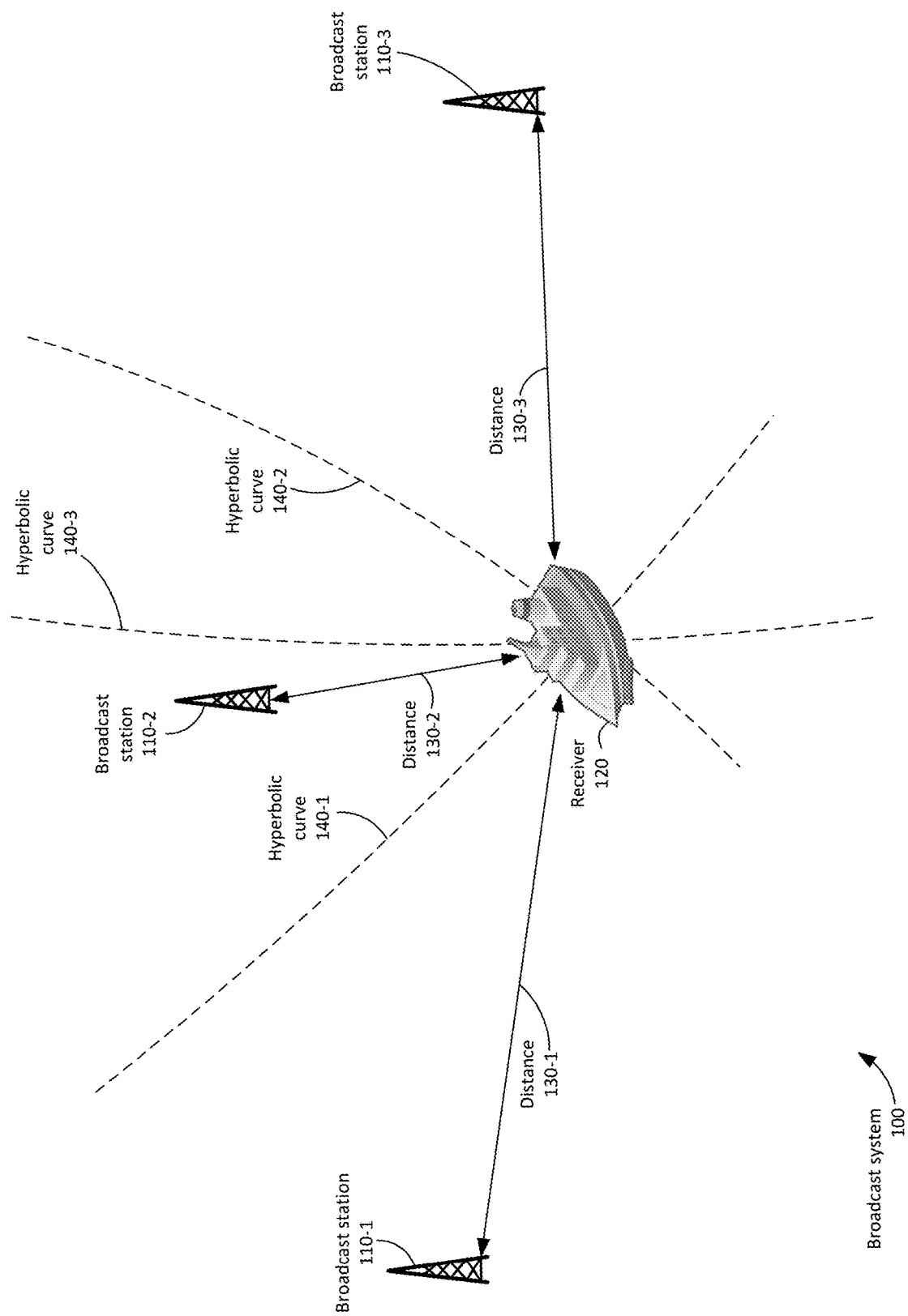
FIG. 1 is a diagram of a broadcast system, according to an embodiment.

Steps have been made to provide backup location and timing services for GNSS, including modernizing the existing LORAN-C broadcast system. The National Timing Resilience and Security Act, for example, establishes requirements for a backup location and timing system that delivers a precise, high-power 100 kHz signal (which was formerly used by LORAN-C) and uses LORAN infrastructure and spectrum. Such a system can help ensure critical infrastructure keeps operating if there are failures or outages in GNSS. Positioning and other timing-related functions can be performed using such a system. FIG. 1 illustrates how positioning can be determined in such a system.

Figure 10:
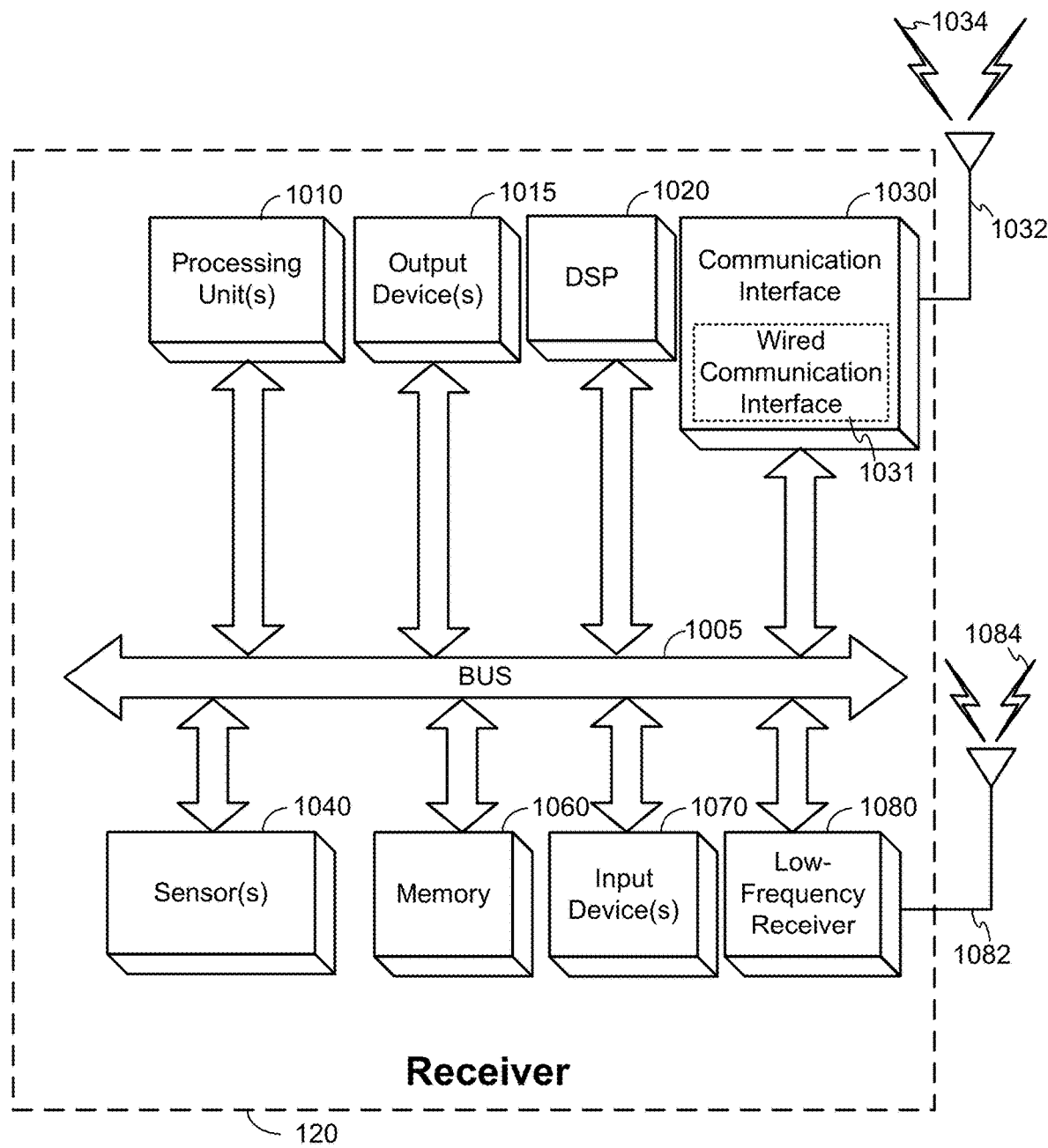
FIG. 10 is a block diagram of an embodiment of a receiver, which can be utilized as described herein.

FIG. 1 is a diagram of an embodiment of a broadcast system 100, which may be used in LORAN-C or other LORAN systems, and which additionally or alternatively may be used to broadcast a modernized signal structure as indicated in the embodiments described in more detail below. The broadcast system 100 comprises a plurality of broadcast stations 110-1, 110-2, and 110-3 (collectively and generically referred to herein as broadcast stations 110) that broadcast radio frequency (RF) signals at precise times relative to one another. These RF signals are referred to herein as "timing reference signals." A receiver 120 can determine its location upon receipt of these timing reference signals by identifying broadcast stations 110 originating respective timing reference signals, and using known locations of the broadcast stations 110 to determine the location of the receiver 120. (For simplicity, the receiver 120 is illustrated in FIG. 1 as a ship, but it will be understood that a receiver 120 may comprise an electronic device or group of devices, which may be located on a ship, vehicle, airplane, or other vessel. Example components of a receiver 120 are illustrated in FIG. 10, which is described in more detail below.)

Positioning can proceed generally as follows. A first broadcast station 110-1 may transmit a first timing reference signal that travels distance 130-1 and is received by receiver 120. A second broadcast station 110-2 and third broadcast station 110-3, which may be located hundreds of kilometers or more away from the first broadcast station 110-1, may similarly transmit respective second and third timing reference signals, which respectively travel distances 130-2 and 130-3. First, second, and third timing reference signals are unique to the broadcast station, enabling the receiver 120 identify the respective broadcast station 110 originating each timing reference signal. And timing reference signals are transmitted at known times, relative to one another. (E.g., the third broadcast station 110-3 broadcasts the third timing reference signal 1 ms after the second broadcast station 110-2 broadcasts the second timing reference signal, which is broadcast 1 ms after the first timing reference signal.) Using the difference in time in which the timing reference signals are received (e.g., Time Difference Of Arrival (TDOA)), and the known relative difference in times at which the timing reference signals are broadcast, the receiver can calculate differences in distances 130 between pairs of broadcast stations 110.

For example, using first and second timing reference signals received by the first broadcast station 110-1 and second broadcast station 110-2 (along with known information regarding the location of these broadcast stations 110-1, 110-2 and respective timing of first and second timing reference signals), the receiver 120 can calculate a difference between the first distance 130-1 and the second distance 130-2, which traces a first hyperbolic curve 140-1. Similarly, second and third timing reference signals can be used to determine hyperbolic curve 140-2 (tracing the difference between distances 130-2 and 130-3), and first and third timing reference signals can be used to determine hyperbolic curve 140-3 (tracing the difference between distances 130-1 and 130-3.) The estimated location of the receiver may comprise a location at which the hyperbolic curves 140 intersect. Alternatively, fewer hyperbolic curves 140 (e.g., two) may be used, and ambiguity resolution (e.g., between two possible locations) can be performed using data from other forms of navigation, such as dead reckoning.

Under LORAN-C, a broadcast system 100 may provide a series of pulses where each pulse has a duration of approximately 200 µs, pulses are separated by roughly 1-2 ms, and each series of pulses is separated by 60-100 ms. Pulses may use a center frequency was 100 kHz (resulting in a 3 km wavelength), with a bandwidth of approximately 20 kHz. The identity of a broadcast station 110 originating a timing reference signal could be determined based on the series of pulses having a unique pattern or frequency, and the location of the broadcast station could be determined by using a lookup table (e.g., index or almanac) to link the unique series of pulses to a location. With a typical transmit power of roughly 1 MW, baselines (e.g., distances 130) could reach 1000 km or more.

The propagation of LORAN-C signals could introduce additional complexity to the broadcast system 100. For example, the "skywave" which is a reflection of the timing reference signal off of the ionosphere, would often prove to be a major error source in timing reference signals received at the receiver 120 because it travels an additional 50 to 1000 km (and is therefore significantly delayed). Lightning, too, would be a source of interference. Additionally, the "ground-wave," which is the direct-path signal used to determine the location of the receiver 120 may be impacted by seasonal variation in ground conductivity, moisture, and more.

Figure 2:
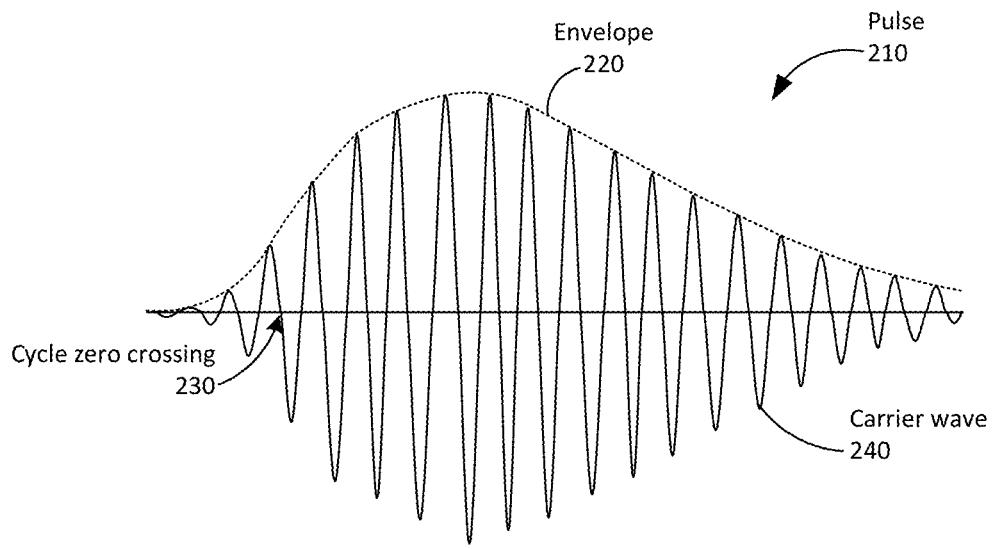
FIG. 2 shows an envelope shape of a LORAN-C pulse, which can be used in timing reference signals in LORAN-C.

FIG. 2 shows the envelope shape a LORAN-C pulse 210, which can be used in timing reference signals in a LORAN-C system in the manner previously described. For LORAN-C positioning, a receiver 120 may estimate the envelope 220 of the pulse 210 in order to determine a coarse time of arrival (ToA) of the pulse 210, and ultimately determine the location of the receiver 120 in the manner previously described. Additionally, the receiver 120 may look for a cycle zero crossing 230 of the carrier wave 240 of the pulse 210 for a finer estimate of ToA. For example, in some applications, the third zero point crossing is used based on a balance of having a relatively favorable signal-to-noise ratio (SNR) within the pulse 210, but also being located toward the beginning of the signal to help reduce multipath interference (which will be discussed in further detail with regard to FIG. 3). As an example, a LORAN-C broadcast system uses a carrier wave 240 of 100 kHz, which is a 3 km wavelength system. The third zero point crossing occurs approximately 9 km away from the start of the pulse. When analyzing multipath from the skywave, the delay of the multipath signal can be compared with this 9 km zero crossing occurrence to determine when multipath could become an issue. That is, when a receiver 120 observes the ground-wave signal to determine the third zero point crossing, which has a 9 km delay, the receiver may experience multipath interference from the skywave will occur if the delay from the skywave is 9 km or less.

Figure 3:
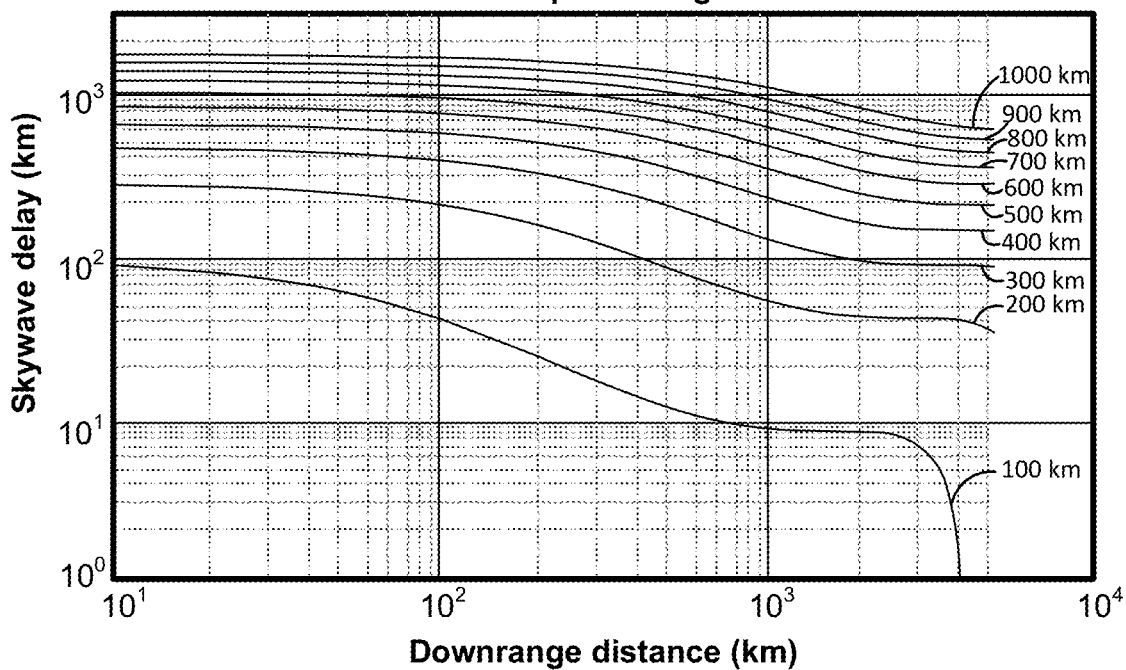
FIG. 3 is a graph showing skywave delay over downrange distance for different ionosphere heights, which may apply to LORAN-C and/or other signals transmitted using the broadcast system of FIG. 1.

FIG. 3 is a graph that plots skywave delay over down-range distance for signals transmitted at 100 kHz. Different curves on the plot indicate different ionosphere heights, ranging from 100 km to 1000 km. (The curve representing the delay from the 100 km skywave reflection has the lowest delay in the plot, while the curve representing the delay from the 1000 km skywave reflection has the highest delay in the plot.) As can be seen, skywave delays from higher-ionosphere reflections (e.g. 1000 km) are much longer than skywave delays from lower-ionosphere reflections (e.g., 100 km), and are therefore much less likely to cause multipath interference. However, as shown in the graph, a skywave delay from a 100 km ionosphere reflection may be 9 km or less at a longer distances (starting at roughly 900 km), and may therefore cause multipath interference with the ground-wave at these longer distances.

To provide a modernized broadcast system that can provide sufficient backup timing and location in the event of a GNSS failure, embodiments provided herein can provide various improvements upon the former LORAN-C system to help optimize the use of this available spectrum while modernizing the signal structure itself. As discussed in more detail below, embodiments may enable a 100 kHz broadcast system that not only provides a timing reference signal (also referred to herein and in the figures as a "reference signal," "RS," or "timing RS") for location determination, but may also enable data communication (e.g., downlink communication from broadcast station 110 to receiver 120) via a dedicated communication channel. Additionally, a modernized signal structure may have a significantly reduced peak-to-average ratio for the transmission power, which could reduce the output requirements for power amplifiers resulting in reduced equipment cost.

Figure 4:
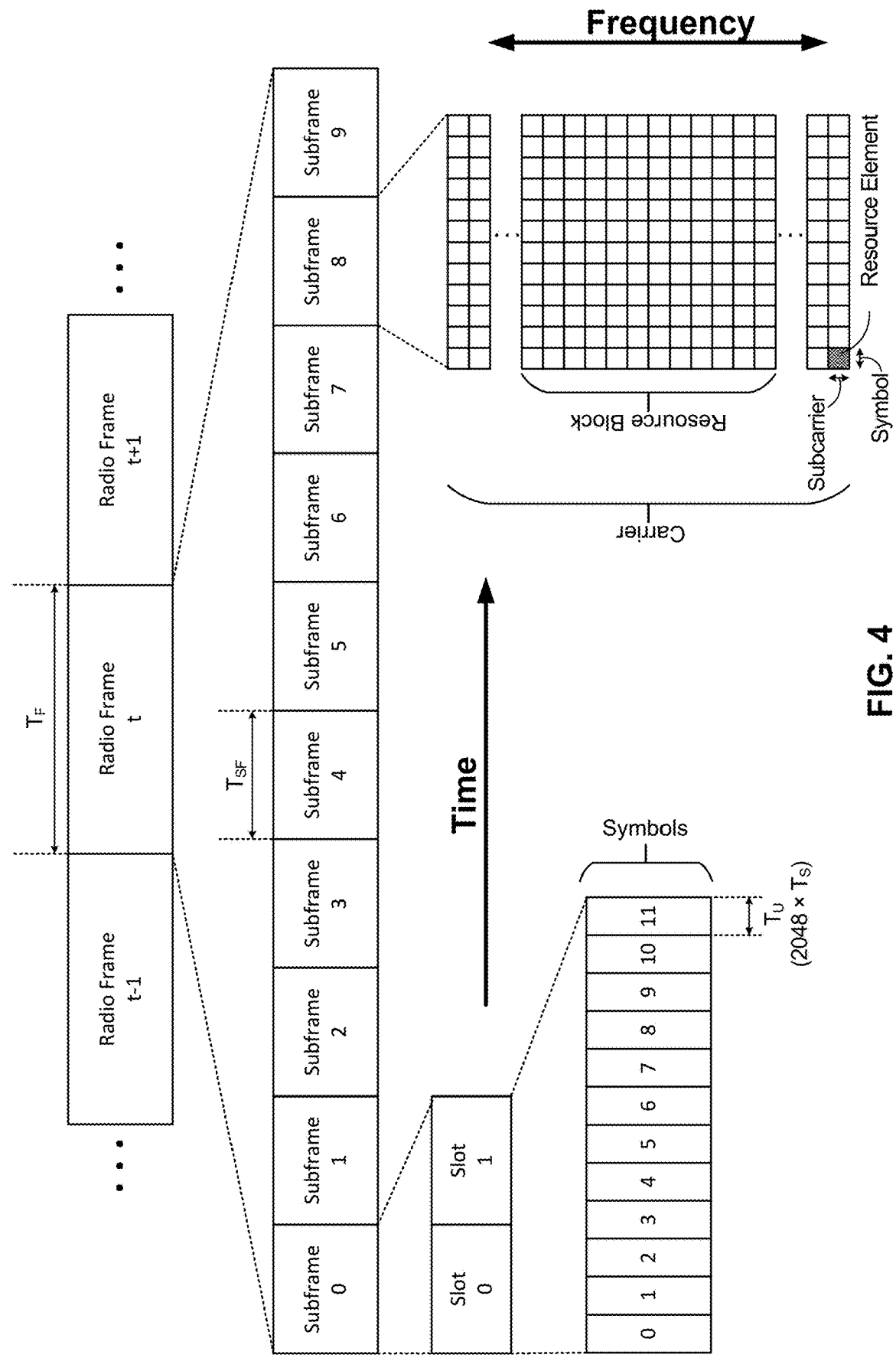
FIG. 4 is a graph illustrating an OFDM signal structure scheme, which can be used to transmit timing reference signals, according to some embodiments.

FIG. 4 is a graph illustrating an OFDM signal structure scheme, which can be used to transmit timing reference signals, according to some embodiments. The various blocks illustrated in FIG. 4 represent resources in both time and frequency domains, which are separated into various blocks as illustrated, echoing an OFDM scheme used in modern-day telecommunications, such as Long-Term Evolution (LTE). It will be understood that, as with other figures, FIG. 4 is provided as a non-limiting example. Alternative embodiments may divide time and/or frequency resources in different ways. For example, an OFDM scheme having a different number of slots and/or symbols may be used, similar to the scheme currently used in in $5^{th}$ Generation New Radio (5G NR, or simply "NR").

With respect to time, time can be divided into a series of successive radio frames, each having a duration of $T_F$. Radio frames can be divided into sub-frames, each having a duration of $T_{SF}$. Subframes can be divided into slots and symbols, as indicated. (E.g., each subframe may comprise two slots in 12 symbols. In some embodiments, slots may not be used.)

With respect to frequency, the available frequency spectrum can be divided into multiple subcarriers. In this scheme, a subcarrier may comprise the basic unit of frequency. In an embodiment in which the carrier frequency is centered at 100 kHz with a bandwidth of 20 kHz, subcarriers therefore may be divisions of frequency spanning from 90 kHz to 110 kHz.

As illustrated, the basic unit the OFDM scheme illustrated in FIG. 4 may comprise a resource element, which spans a single subcarrier and a single symbol. Resource blocks may be formed from groups of resource elements that are adjacent in both time and frequency, and used to transmit timing reference signals and other signals.

Returning to the example in which the carrier frequency is centered at 100 kHz with a 20 kHz bandwidth, the values in an OFDM scheme adopt a version of an LTE scheme, scaled by a factor of 1000 with respect to subcarrier spacing. Thus, rather than a 15 kHz subcarrier, the OFDM scheme can use a 15 Hz subcarrier. This results in a radio frame may have a duration $T_F$ of 10 seconds with 10 subframes each having a duration $T_{SF}$ of 1 second. The smallest unit of time in this scheme, $T_S$, is calculated as the inverse of the subcarrier spacing multiplied by the number of useful bits (bits minus the cyclic prefix) per symbol: $T_S=1/(15\times2048)=32.55$ ms. When multiplied by the speed of light, this gives an approximate length of 9.75 km per bit. In some embodiments, a Sequence Frame Number (SFN) of 10,240 seconds can be used for frame tracking (again, a scaled version of the 10.24 second SFN used in LTE).

According to embodiments, positioning of a receiver 120 can be based on receiving a timing reference signal sent using one or more resource blocks (as described in more detail below) and determining a time at which the timing reference signal was received. Accordingly, embodiments may use correlation sequences, such as Gold-code sequences. It can be noted that, with values scaled of the example 100 kHz system described in the previous paragraph, the null-to-null correlation peak would be roughly 33 km, which is more than the 9 km accuracy for multipath isolation in a traditional LORAN-C system (using the third zero point crossing as previously discussed). However, embodiments may utilize a multitude of samples of the correlation peak, each spaced at a fraction of 33 km. For example, by having a sampling rate of a quarter of the correlation peak null-to-null width, the resulting resolution would be just over 8 km, which has a higher accuracy than a traditional LORAN-C system.

As noted, a modernized broadcast system may send data communication in addition to timing reference signals. And thus, some embodiments may use a cyclic prefix can be used to mitigate inter symbol interference. When determining a suitable cyclic prefix, the unique interference considerations at low frequency (e.g., 100 kHz) previously discussed with regard to FIG. 3 may be considered. For example, in some embodiments, an Extended Cyclic Prefix (ECP) may be used rather than a Normal Cyclic Prefix (NCP) because the length of ECP ($512\times T_S$) is roughly 5000 km, which exceeds the maximum skywave delay interference. (As shown in FIG. 3, the maximum skywave delay interference from a 1000 km ionosphere height is less than 2000 km.) On the other hand, the length of NCP ($144\times T_S$) results in a length roughly 1400 km, which can experience skywave delay interference.

As noted, embodiments may use Gold-code sequences for timing reference signals. And thus, Gold-code sequence generators using other technologies (e.g., NR) may be used. Additionally, as discussed in more detail below, the full frequency spectrum may be used (e.g., each resource block may include data transmission using every subcarrier frequency) per resource block. This can result in no ambiguities or alias terms in a corresponding time-domain correlation peak if the correlation peak is aggregated from reference signal elements from the entire subframe (e.g., comprising a group of 6 out of 12 symbols in a sub-frame for a comb-6 signal).

For data communications, data rates can vary based on the amount of resource elements used per resource block and modulation. As discussed in more detail below, embodiments may send data utilizing comb-6, comb-3, comb-2, or comb-1 schemes. Additionally, different forms of modulation can be used, including QPSK, 16QAM, and 64QAM. As an example, an embodiment utilizing comb-6 would be capable of communicating 12 resource elements per resource block. With the bandwidth of 20 kHz, a broadcast station 110 may be capable of sending 100 resource blocks per second. This results in 1200 resource blocks per second. QPSK modulation can result in two bits per resource element, thereby resulting in 2400 baud per broadcast station 110. Broadcast stations 110 can send different data, thereby increasing total capacity of a broadcast system 100 for broadcasting data.

Embodiments may also employees muting, depending on desired functionality. That is, different broadcast stations 110 may refrain from transmitting timing reference signals and optionally also the data signals during certain periods of time to enable receivers to receive signals from other broadcast stations without interference. Additional details regarding how embodiments may employ a muting are provided herein below. Muting could be enabled e.g. on symbol-level, sub-frame-level, or frame-level.

Because embodiments of a modernized broadcast system as described herein may enable one-way communications (rather than two-way communication used in modern day telecommunications), considerations for uplink communications may not need to be taken into account. As such, embodiments may exclude the use of random-access channels, other (non-positioning) reference signals, and so forth, which are used in wireless two-way communication. Even so, in the event that two-way communication is desired in some embodiments, such considerations may be made.

Figure 5:
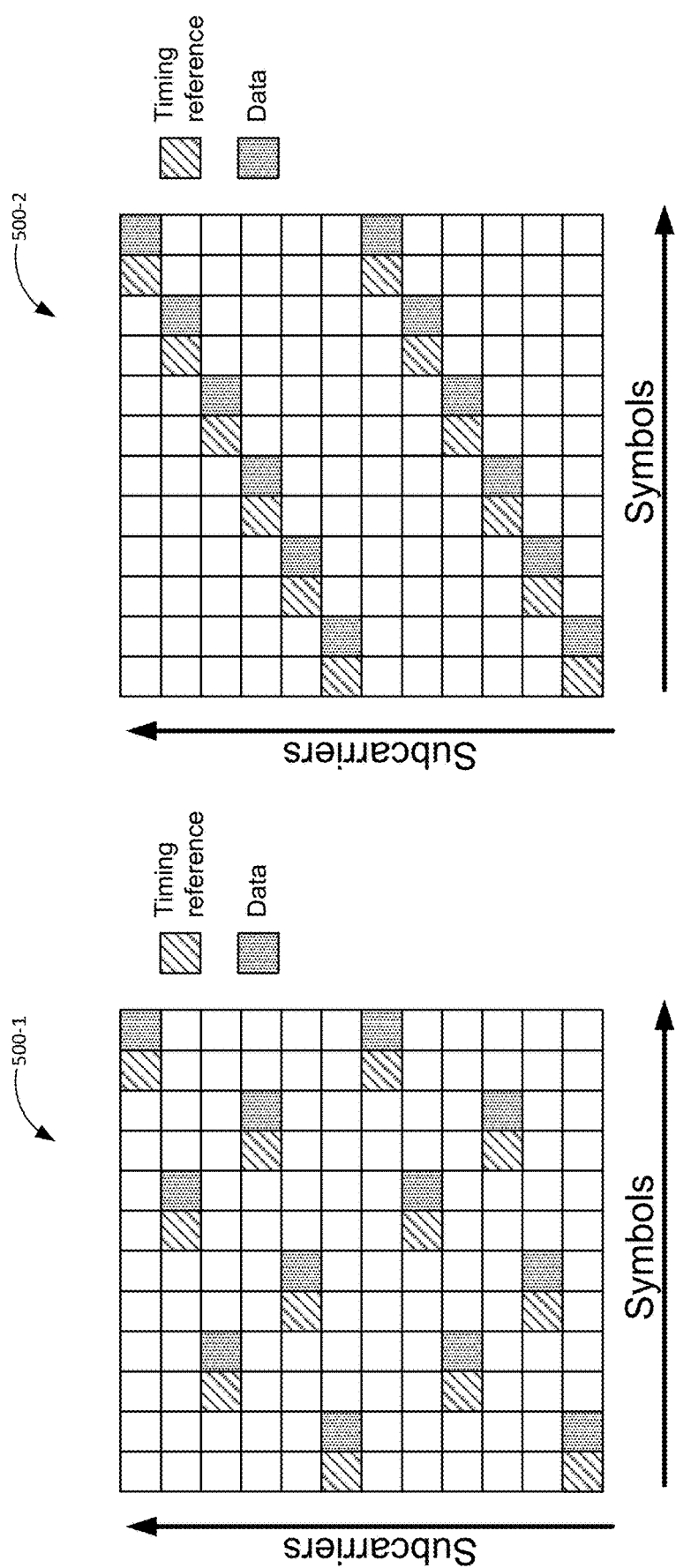
FIG. 5 is an illustration of two signal structure options for various embodiments.

FIG. 5 is an illustration of two signal structure options for various embodiments, shown in resource blocks 500-1 and 500-2 (collectively and generically referred to herein as resource blocks 500). As noted in the examples above, each resource block 500 may extend second in length, and each subcarrier may be 15 Hz, although the lengths of symbols and frequencies of subcarriers may vary depending on desired functionality, as may the number of symbols. As a person of ordinary skill in the art will appreciate, there may be many resource blocks per subframe. (As previously noted, to utilize more of the 20 kHz available bandwidth, there may be 100 resource blocks per subframe, located at different frequencies and having different subcarriers.) As illustrated in the differences between the signal structures of the first resource block 500-1 and the second resource block 500-2, reference signals and data may be transmitted using a plurality of resource elements from a plurality of resource blocks. As can be seen, embodiments may employ a signal structure in which resource elements used to transmit a timing reference signal are followed by resource elements used to transmit data.

With regard to subcarrier usage, embodiments may transmit the timing reference signals and data on each subcarrier of a resource block. As illustrated in FIG. 5, for example, each subcarrier is used once within a resource block to transmit the timing reference signal. Moreover, this pattern may be repeated for all resource blocks spanning the bandwidth of the carrier. Thus, when performing a coherent integration of timing reference signals across one second (the length of the resource blocks), the resulting frequency domain pulse response would be full bandwidth. This can help prevent ambiguities in the correlation and resulting location determination.

Depending on desired functionality, different signal structures may be employed to provide a more robust broadcasting case of a symbol outage. For example, the second signal structure 500-2 structure provides the full bandwidth frequency domain response discussed above by using each subcarrier, similar to the first signal structure 500-1. However, because the second signal structure 500-2 moves to an adjacent subcarrier after transmitting timing reference signals and data, the structure may be more vulnerable to consecutive symbol outages. This is because this structure makes the resolving of ambiguities (arising from alias terms due to holes in the frequency domain response) relatively difficult. The first signal structure 500-1, on the other hand, helps avoid this problem by moving to a nonadjacent subcarrier (a subcarrier that is not immediately adjacent) after each transmission of timing reference signal and data. Any resulting frequency holes due to a symbol outage would be more "spread around" in the spectrum, and therefore the resulting ambiguities would be easier to resolve. As will be appreciated, alternative embodiments may employ a wide variety of alternative signal structures that use similar mechanisms.

As noted, the use of all subcarriers over in the resource blocks used to transmit a timing reference signal in a given subframe can provide a full spectrum signal when coherent integration is performed across the subframe, thereby reducing ambiguity terms that may arise due to partial-spectrum usage. However, embodiments may not be so limited. For example, in some embodiments coherent integration may take place over a portion of a resource block, allowing for faster integration if ambiguities can be resolved. For example, resolving ambiguities can be facilitated by using a tracking technique in which an initial integration of an entire subframe (e.g., one second) to resolve any ambiguities, then subsequent integrations over only a portion of the subframe (e.g., if made on a per-symbol basis, coherent integration may only be over $\frac{1}{12}$ of a second, for example). Resulting ambiguities in these subsequent integrations could then be resolved by leveraging prior information gained from the initial integration. Additional or alternative information sources may allow for resolving ambiguities resulting from partial-spectrum usage.

Because resource elements for transmitting data can immediately follow those used for transmitting timing reference signals, the resulting demodulation of the data may be more simple at a receiver 120. That is, a receiver 120 can use signal used to transmit the timing reference signal as a phase reference in the demodulation of the subsequent data. For example, in instances in which signals are modulated using a QPSK modulation scheme (having four phases), because the phases used in the modulation of the timing reference signal are known, they can be used as a phase reference for demodulation of the following data.

It can be noted that, although the embodiments illustrated in FIG. 5 utilize a comb-6 structure, alternative embodiments are not so limited. As a person of ordinary skill in the art will appreciate, comb-6 is a structure in which data is broadcast in every $6^{th}$ subcarrier, enabling the effective increase in transmit power by the broadcast stations. However, alternative embodiments may utilize comb-1, comb-2, or comb-3 structures, depending on desired functionality.

Figure 6:
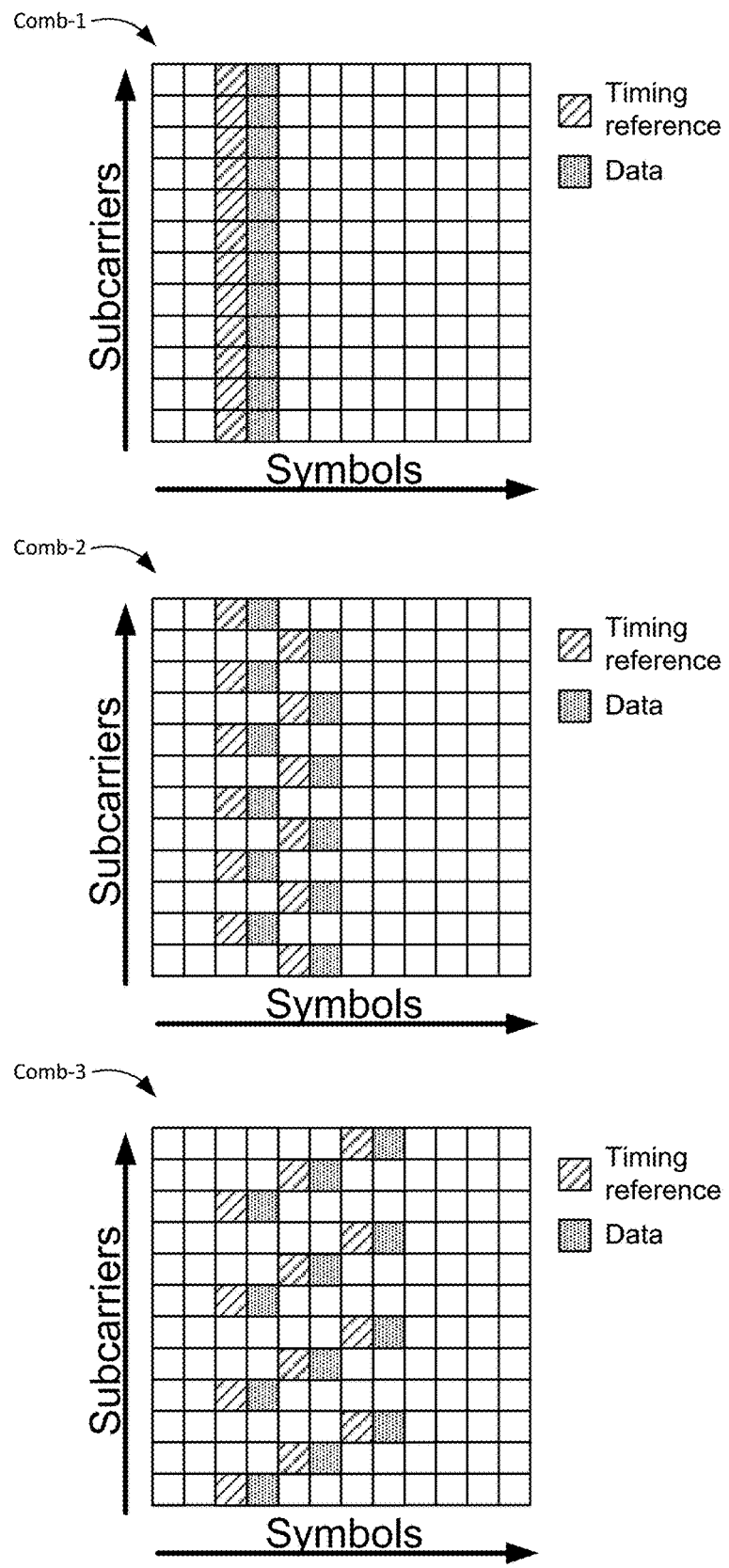
FIGS. 6 and 7 are illustrations of what signal structures using comb-1, comb-2, and comb 3 may look like, according to some embodiments.
Figure 7:
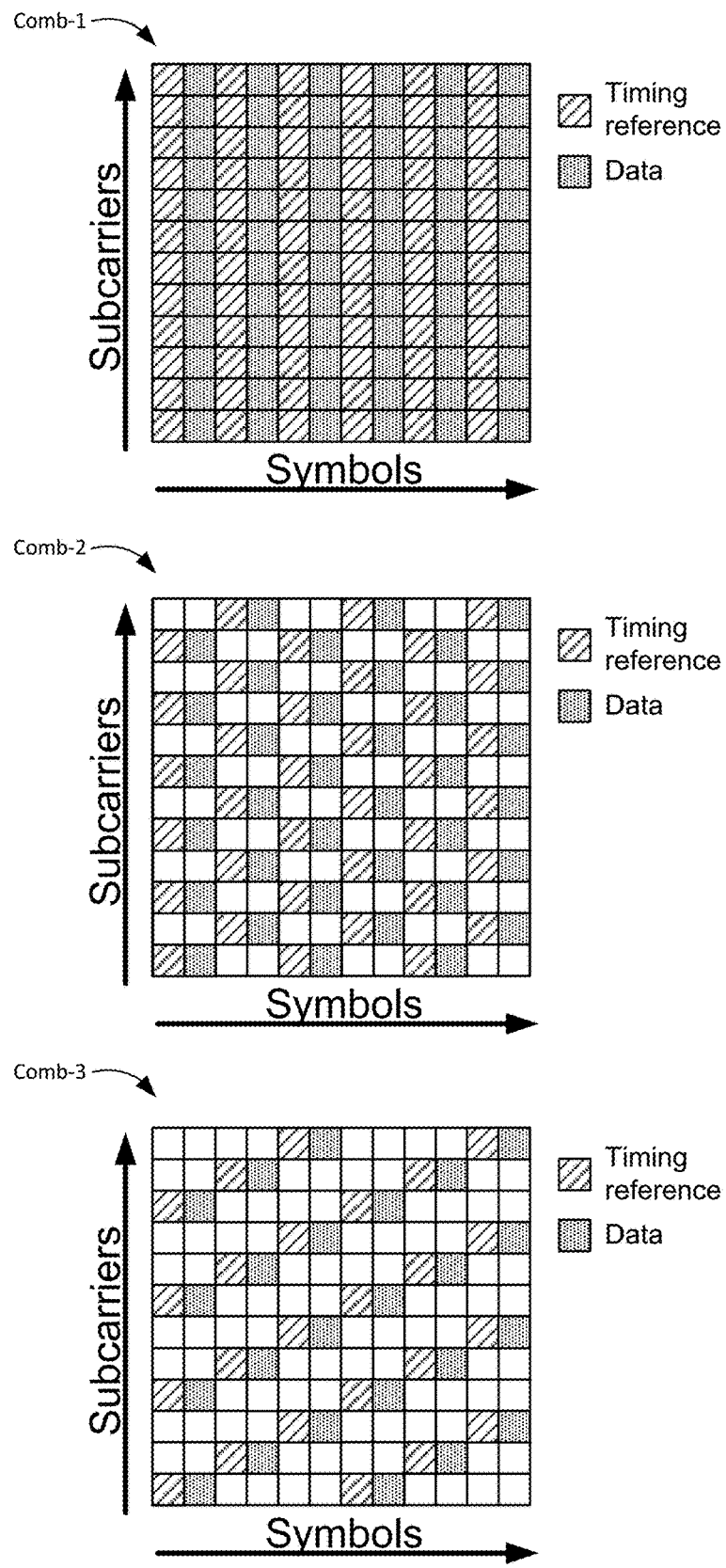

FIG. 6, for example, illustrates what embodiments utilizing comb-1, comb-2, and comb-3 signal structures may look like. The examples illustrated initiate transmission of the timing reference signal and data signal at the third and fourth symbols of each resource block, but embodiments are not so limited. Different embodiments may initiate transmission at different times, may utilize different patterns, and/or may utilize a different number of resource elements. With regard to the usage of resource elements, the examples illustrated in FIG. 6 use the same number of resource elements as the examples in FIG. 5, two resource elements (one for the timing reference signal, and another for data). Again, however, embodiments are not so limited. For example, FIG. 7 illustrates what embodiments utilizing comb-1, comb-2, and comb-3 signal structures may look like where transmissions are made during all symbols of a resource block. Other embodiments may vary.

Some embodiments may utilize code space to identify different broadcast stations 110, where each station may have a unique ID/code. However, to help make the system more efficient (by preventing searches across a large code space) the number of codes may be reduced to the amount of stations whose transmissions are detectable at any given receiver. Thus, embodiments may utilize the "soft requirement" wherein broadcast stations 110 can be organized in orthogonal groups, where the resulting broadcast station ID space size is divisible by comb number. For example, where 10 groups are used for comb-6 signal structures, the resulting broadcast station ID space size would be 60. This space size may be sufficient, given the fact that the number of LORAN-C stations in North America is 28. In fact, alternative embodiments could use a smaller space size, although using a code space size of 60 may help future proof the design if additional broadcast stations 110 are used in the future.

Codes may be generated using code sequence generators (e.g., a Gold-code sequence generator). In some embodiments, the code sequence generator may generate unique sequences as a function of symbol and subframe or slot, in a manner similar to NR/LTE. Generating unique codes based on the symbol and subframe/slot number in this manner can increase the code space a factor of 10. Continuing with the example where the station ID space is 60, this could result in 600 searchable codes. That said, embodiments may not be so limited. In some embodiments, for example, codes may additionally or alternatively be a function of frame number, which could increase the code size by a factor of 1024.

According to some embodiments may employ v-shift "hopping" to account for the fact that timing reference signals from different broadcast stations 110 may collide. In v-shift hopping, groups of broadcast stations can shift subcarrier usage as a function of subframe and/or slot, thereby allowing signals that may collide in one subframe to avoid collision in another.

Figure 8:
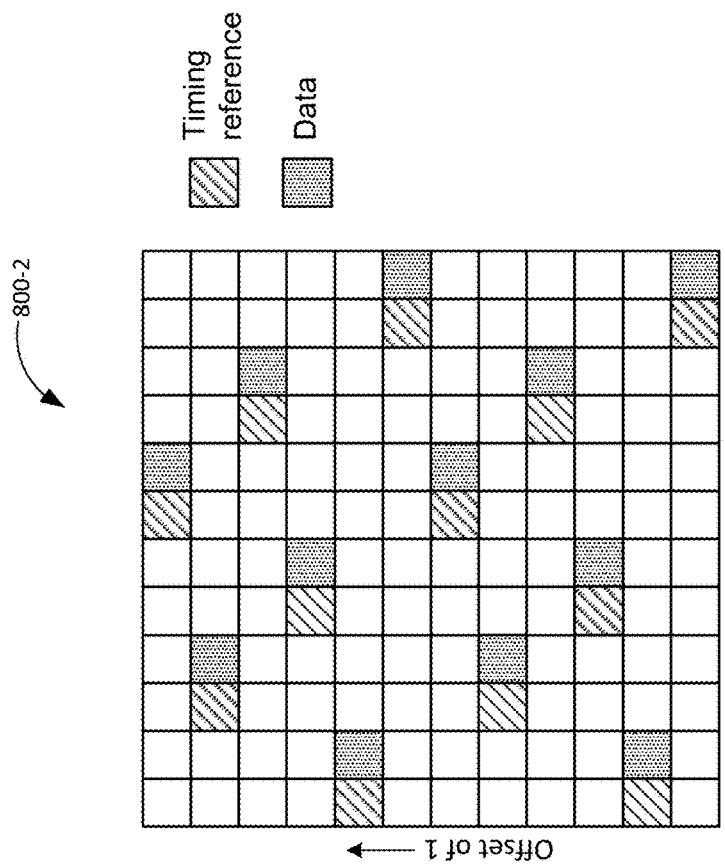
FIG. 8 are illustrations of how some embodiments may employ v-shift hopping.
Figure 8:
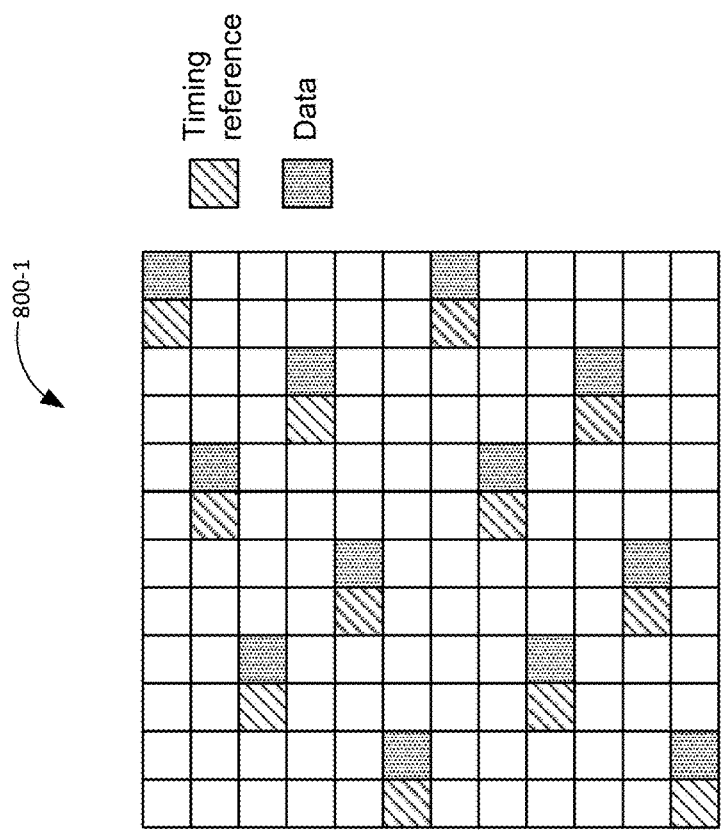

FIG. 8 provides an illustration of v-shift hopping. A first resource block 800-1 shows a pattern of timing reference and data signals with no shift. This may be considered a base or standard pattern, from which v-shift offsets may be made. A second resource block 800-2 shows an example of how the pattern of resource elements used in the first resource block 800-1 may be offset by one subcarrier to help prevent collisions among broadcast stations 110. For a comb-6 pattern in a resource block 800 having 12 subcarriers, the pattern may be offset by up to five subcarriers before the pattern repeats. Thus, including a shift of 0, there are six available v-shift offsets. (Similarly, there are three available V shift offsets for a comb-3 signal structure and two for a comb-2 signal structure.) A broadcast station 110 can engage v-shift hopping by applying different V-shift offsets at different times, thereby using different subcarriers to transmit different timing reference and data signals. An example of how this may be implemented is illustrated in FIG. 9.

FIG. 9 is a table that illustrates how a broadcast system 100 may implement v-shift hopping, according to an embodiment. The table shows offsets employed by different groups of broadcast stations 110 for different subframes. The first column shows the IDs of the broadcast stations 100, which are divided into groups of six. The remaining columns show the v-shift offsets employed by each group for a given subframe. (The offsets here represent a comb-6 signal structure in a resource block similar to those illustrated in FIG. 8, having 12 subcarriers. As noted previously, because signals are broadcast on two subcarriers of a resource block at a time, there are six available offsets: 0-5.) At subframe 0, none of the groups use an offset. In the following subframe, half of the groups use an offset of 1. Additional groups of broadcast stations 110 employ additional offsets in subsequent subframes. Ultimately, the various groups of broadcast stations cycle through offsets so that each group will avoid colliding with each other group for at least one subframe. As will be appreciated, the table shown in FIG. 10 provides only one example of how v-shift hopping could be implemented. Alternative embodiments could utilize additional or alternative v-shift hopping patterns.

Additionally or alternatively, as previously noted, embodiments may employ muting in a similar way, where different groups of broadcast stations refrain from broadcasting signals as a function of subframe, to help prevent signal collision. More specifically, a broadcast station 110 may send timing reference and data signals on a predetermined schedule or periodicity. Muting occurs when the broadcast station 110 refrains from broadcasting the timing reference signal, and optionally the data signal, in a given scheduled periodic instance. Similar to FIG. 9, broadcast stations 110 may be divided into different groups, where each group uses different muting patterns to help reduce signal collision between groups. For example, for every 10 subframes, a first group may mute on subframes zero, two, four, six, and eight; a second group may mute on subframes zero, one, two, three, and four; ⅓ group may mute on subframes zero, three, six, and nine; etc.

Some embodiments may include techniques for mitigating inter-symbol interference and inter-carrier interference. As previously noted, for example, embodiments may utilize an ECP having a length greater than the maximum ionosphere delay to help reduce inter-symbol interference. Additionally or alternatively, embodiments may account for inter-carrier interference arising from different broadcast stations being misaligned in frequency. For example, frequency changes due to Doppler at Mach 1 are 0.1133 Hz, which is far less than the 15 Hz subcarrier spacing that may be used in some embodiments. Clock accuracy targets, therefore, can be determined from subcarrier spacing and Doppler requirements. A target example with a maximum of 0.15 Hz (larger than the frequency offset at Mach 1) would result in a 1.5 parts per million (PPM) offset. Having a clock of that quality would enable a receiver to avoid a frequency search and move directly to performing a time search for broadcast signals.

As previously noted, data signals can accompany timing reference signals, providing a downlink data channel from broadcast stations 110 to receivers 120. In some instances, however, such data may not be needed. As such, some embodiments may engage in data throttling such that data is transmitted in only a portion of the subframes. For example, data may be communicated in one of every 10 subframes, resulting in ¹⁄₁₀ the baud rate. A larger or smaller number of subframes could be used for data, as needed. According to some embodiments, this may be set dynamically and communicated to receivers 120, to accommodate increases or decreases in data requirements.

Additionally or alternatively, embodiments may utilize data repetition to ensure data is sufficiently communicated to receivers. In some embodiments, for example, data may simply be repeated across different resource blocks in frequency and/or time. This can help ensure effective data communication if one or more subcarriers experiences and outage.

In some embodiments, data can be encoded with Zadoff Chu codes, which can result in a correlation gain. For example, for comb-6 implementations with a bandwidth of 20 kHz and a subcarrier spacing of 15 Hz, there may be 200 resource elements per symbol. Zadoff Chu codes use prime number-length sequences, so a Zadoff Chu code of length 199 (which is a prime number) can be used. Difference Zadoff Chu codes can be assigned as data. Because there are 198 sequences having a length of 199, each of the 198 sequences can be assigned a series of bits, resulting in roughly 7.5 bits per symbol, or a 45 baud capacity.

In some embodiments, pi/2-BPSK modulation may be used (e.g., instead of QPSK or other modulation schemes). Like Zadoff Chu codes, this type of modulation can result in a reduced peak-over-average ratio of signal, which can result in an increased signal level. While this may decrease the data capacity, it can be particularly beneficial to provide for a larger range for broadcast signals without saturating the power amplifier of the broadcast station's transmitter. Similarly, embodiments may use Alamouti coding to extend reception range.

FIG. 10 illustrates an embodiment of a receiver 120, which can be utilized as described herein above. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations. For example, the receiver 120 may be integrated into and/or utilized by an airplane, ship, or other vehicle, and may comprise various components disposed at different locations on the vehicle.

The receiver 120 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 10, some embodiments may have a separate Digital Signal Processor (DSP) 1020, depending on desired functionality. Location determination and/or other determinations based on wireless communication may be provided in the processing unit(s) 1010 and/or communication interface 1030 (discussed below). The receiver 120 also can include one or more input devices 1070, which can include without limitation a keyboard, touch screen, a touch pad, microphone, button(s), dial(s), switch(es), and/or the like; and one or more output devices 1015, which can include without limitation a display, light emitting diode (LED), speakers, and/or the like.

The receiver 120 may also include a communication interface 1030, which may comprise without limitation a modem, a network card, an infrared communication device, a wired communication device, a wireless communication device, and/or a chipset, and/or the like, which may enable the receiver 120 to send and/or receive data communications via wired and/or wireless means. This can include wireless communication such as cellular, Wi-Fi, Bluetooth, traditional marine and/or aviation radiofrequency (RF) communication, etc., in addition or as an alternative to wireline communication using fiber optic, coaxial cable, twisted-pair, and/or similar wired means. Such wired communications may take place via a wired communication interface 1031, which may be a subcomponent of the communication interface 1030, as illustrated. In alternative embodiments, the wired communication interface 1031 may be separate from the communication interface 1030. The communication interface 1030 may therefore permit data and signaling to be communicated (e.g. transmitted and received) with a network and/or network components, computer systems, and/or any other electronic devices.

In particular, depending on desired functionality, the communication interface 1030 may comprise separate transceivers to wirelessly communicate with base stations and other terrestrial transceivers, such as wireless devices and access points. The receiver 120 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more radio access technologies (RATs) such as CDMA2000, Wideband CDMA (WCDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from the Third Generation Partnership Project (3GPP). Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN. The communication can be carried out via one or more wireless communication antenna(s) 1032 that send and/or receive wireless signals 1034. The communication interface 1030 and/or processing unit(s) 1010 may perform the demodulation, correlation, integration, and/or other processing of timing reference signals and/or data signals as described herein.

The receiver 120 can further include sensor(s) 1040. Sensors 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the position determination described herein, in some instances. As previously noted, for example, the receiver 120 may use dead reckoning to resolve ambiguities in a position determination. The sensor(s) 1040 may comprise one or more motion sensors that may be used to perform the dead reckoning.

Embodiments of the receiver 120 may also include a low-frequency receiver 1080, capable of receiving signals broadcast by broadcast stations in the manner indicated in the previously-described embodiments. Put broadly, the low-frequency receiver may receive RF signals in the low-frequency (LF) band (30 kHz-300 kHz). More specifically, the low-frequency receiver 1080 may be tuned to receive signals in a frequency band centered at substantially 100 kHz, as described herein. In some embodiments, the low-frequency receiver 1080 may be part of a low-frequency transceiver used in maritime radio, maritime navigation, and/or other applications.

Some embodiments of the receiver 120 may also include a GNSS receiver (not shown), such as GPS, which may be used at times where no GNSS outage has occurred. The GNSS receiver may be capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver can extract a position of the receiver 120, using conventional techniques, from GNSS satellites of a GNSS system, GPS, Galileo, Glonass, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

The receiver 120 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the receiver 120 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the receiver 120 (and/or processing unit(s) 1010 or DSP 1020 within receiver 120). In an aspect, then, such code and/or instructions can be used to configure and/or adapt a general purpose computer (or other device) to perform one or more operations in accordance with the described methods.

Figure 11:
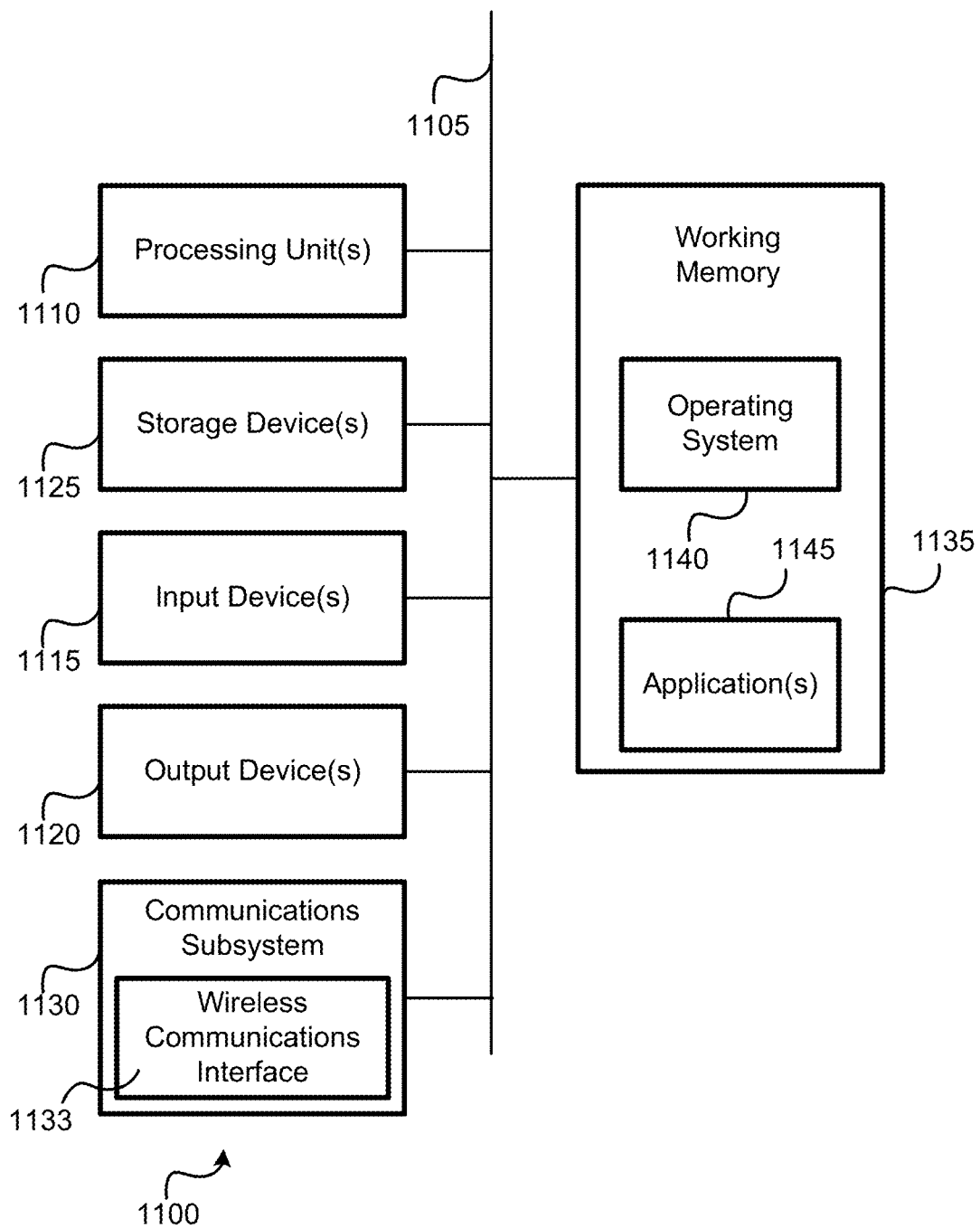
FIG. 11 is a block diagram of an embodiment of a computer system, which can be utilized by a broadcast station to cause the broadcast station to perform the techniques as described herein.

FIG. 11 illustrates an embodiment of a computer system 1100, which may be utilized and/or incorporated into one or more components of a broadcast station 110, as described herein. FIG. 11 provides a schematic illustration of one embodiment of a computer system 1100 that can perform the methods provided by various other embodiments. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. In addition, it can be noted that components illustrated by FIG. 11 can be localized to a single device and/or distributed among various networked devices. As noted in the previously-described embodiments, the location of the broadcast station 110 (or more specifically, a transmitter of the broadcast station 110, which may be part of the wireless communications interface 1133 of FIG. 11 and described herein below) may be known and used for position determination of one or more receivers 120. Known positions of broadcast stations 110 may be kept in a lookup table (e.g., database or almanac) of the one or more receivers 120.

The computer system 1100 is shown comprising hardware elements that can be electrically coupled via a bus 1105 (or may otherwise be in communication, as appropriate). The hardware elements may include processing unit(s) 1110, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 11. The computer system 1100 also can include one or more input devices 1115, which can include without limitation a mouse, a keyboard, a camera, a microphone, and/or the like; and one or more output devices 1120, which can include without limitation a display device, a printer, and/or the like.

The computer system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The computer system 1100 may also include a communications subsystem 1130, which can include support of wireline communication technologies and/or wireless communication technologies managed and controlled by a wireless communication interface 1133. The wireless communication interface 1133 may also be used to transmit the broadcast signals described herein. As such, the wireless communications interface 1133 and/or processing unit(s) 1110 may be used to create, modulate, and transmit the broadcast signals as described herein, which may be transmitted using a transmitter of the wireless communications interface 1133. The communications subsystem 1130 may include a modem, a network card (wireless or wired), an infrared communication device, a wireless communication device, and/or a chipset, and/or the like. The communications subsystem 1130 may include one or more input and/or output communication interfaces, such as the wireless communication interface 1133, to permit data and signaling to be exchanged with a network, remote devices, other computer systems, and/or any other electronic devices described herein. Data broadcast by broadcast stations 110 using data signals described herein may be received, for example, via the communications subsystem 1130 from one or more remote devices. Additionally or alternatively, data may originate from broadcast stations 110 themselves.

In many embodiments, the computer system 1100 will further comprise a working memory 1135, which can include a RAM and/or or ROM device. Software elements, shown as being located within the working memory 1135, can include an operating system 1140, device drivers, executable libraries, and/or other code, such as application(s) 1145, which may comprise computer programs provided by various embodiments, and/or may be designed to implement methods, and/or configure systems, provided by other embodiments, as described herein. Merely by way of example, one or more procedures described with respect to the method(s) discussed above, may be implemented as code and/or instructions that are stored (e.g. temporarily) in working memory 1135 and are executable by a computer (and/or a processing unit within a computer such as processing unit(s) 1110); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

Figure 12:
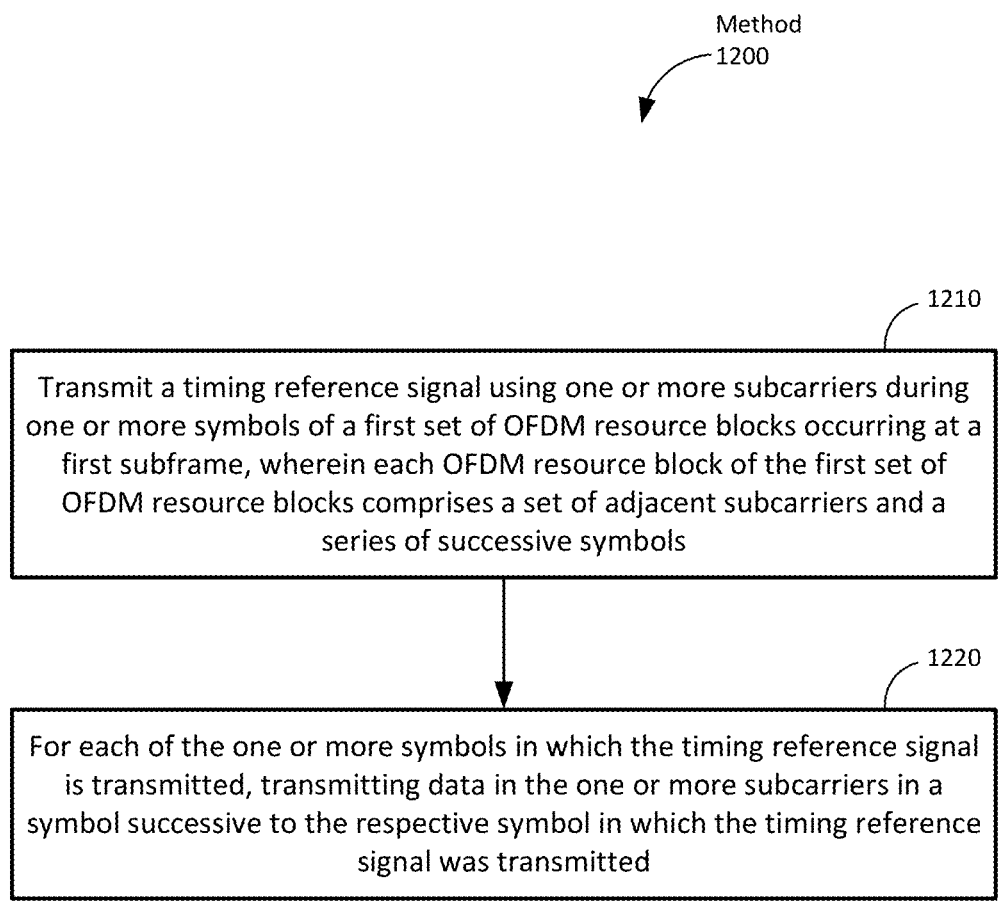
FIG. 12 is a flow diagram of a method of transmitting wireless RF timing reference signals from a broadcast station, according to an embodiment.

FIG. 12 is a flow diagram of a method 1200 of transmitting wireless RF timing reference signals from a broadcast station, according to an embodiment. As with other figures herein, FIG. 12 is provided as a non-limiting example. Alternative embodiments may include additional or alternative functions to those illustrated in the blocks shown in FIG. 12. Means for performing the functions of the blocks may comprise hardware and/or software components of a computer system as illustrated in FIG. 11 and previously described, which may be integrated into a broadcast station 110.

The functionality at block 1210 comprises transmitting a timing reference signal using one or more subcarriers during one or more symbols of a first set of OFDM resource blocks occurring at a first subframe, wherein each OFDM resource block of the first set of OFDM resource blocks comprises a set of adjacent subcarriers and a series of successive symbols. As noted with regard to the resource blocks in the above-described embodiments, resource blocks may include any number of adjacent subcarriers and symbols. Means for performing the functionality at block 1210 may include a processing unit(s) 1110, bus 1105, working memory 1135, communications subsystem 1130, wireless communication interface 1133, and/or other components of a computer system, such as the computer system 1100 as illustrated in FIG. 11 and described above, which may be integrated into a broadcast station 110.

The functionality at block 1220 comprises, for each of the one or more symbols in which the timing reference signal is transmitted, transmitting data in at least one of the one or more subcarriers in one or more symbols successive to the symbol in which the respective timing reference was transmitted. As previously noted, sending data in symbols immediately subsequent to symbols used for timing reference signals can result in efficiencies because receivers 120 may then use the timing reference signal as a phase reference for demodulating the data. Means for performing the functionality at block 1220 may include a processing unit(s) 1110, bus 1105, working memory 1135, communications subsystem 1130, wireless communication interface 1133, and/or other components of a computer system, such as the computer system 1100 as illustrated in FIG. 11 and described above, which may be integrated into a broadcast station 110.

As detailed in the previously-described embodiments, embodiments may include additional features, depending on desired functionality. According to some embodiments, the timing reference signals and data are transmitted using a frequency band centered at substantially 100 kHz. Additionally or alternatively timing reference signals and data are transmitted using a comb-6, comb-3, comb-2, or comb-1 signal structure. As illustrated with regard to FIG. 5, timing reference and data signals may be transmitted using pairs of subcarriers to transmit the signals on successive symbols. As such, alternative embodiments of the method 1200 may include transmitting the timing reference signals and data such that, for each resource block of the first set of OFDM resource blocks, a first pair of the one or more subcarriers is used for a first plurality of successive symbols of the respective OFDM resource block, and a second pair of the one or more subcarriers is used for a second plurality of successive symbols of the respective OFDM resource block immediately following the first plurality of successive symbols. Moreover, as illustrated in FIG. 5, the signal structure may be such that nonadjacent subcarriers are used in successive symbols to reduce the impact of a subcarrier outage. As such, according to some embodiments, neither subcarrier in the second pair of subcarriers is immediately adjacent to either subcarrier in the first pair of subcarriers.

Embodiments may additionally or alternatively include muting and/or hopping patterns, depending on desired functionality. According to some embodiments, for example, the method 1200 may implement muting by further comprising transmitting additional timing reference signals and data in a plurality of subsequent sets of OFDM resource blocks such that a muting pattern is executed to omit the transmittal of a portion of the additional timing reference signals and data during at least one set of OFDM resource blocks of the plurality of subsequent sets of OFDM resource blocks. To implement frequency hopping, some embodiments may additionally comprise transmitting additional timing reference signals and data in a plurality of subsequent sets of OFDM resource blocks such that a frequency offset is implemented to offset the frequency of the transmittal of at least a portion of the additional timing reference signals and data during at least one set of OFDM resource blocks of the plurality of subsequent sets of OFDM resource blocks.

The timing reference signals and data transmitted in the method 1200 may vary in other regards as well, depending on desired functionality. For example, the timing reference signals and data are transmitted using pi/2 Binary Phase Shift Keying (BPSK), Quadrature Phase Shift Keying (QPSK), 8-Phase Shift Keying (8-PSK), 16-Quadrature Amplitude Modulation (16QAM), or 64QAM modulation, or any combination thereof. Optionally, the timing reference signals and data are transmitted such that, for each resource block of the first set of OFDM resource blocks, all subcarriers of the respective OFDM resource block are used. In some embodiments, timing reference signals are transmitted using a code unique to the broadcast station within a code space for broadcast stations. This may include a Gold code, for example. Additionally or alternatively, the data may be transmitted using a Zadoff Chu code.

Figure 13:
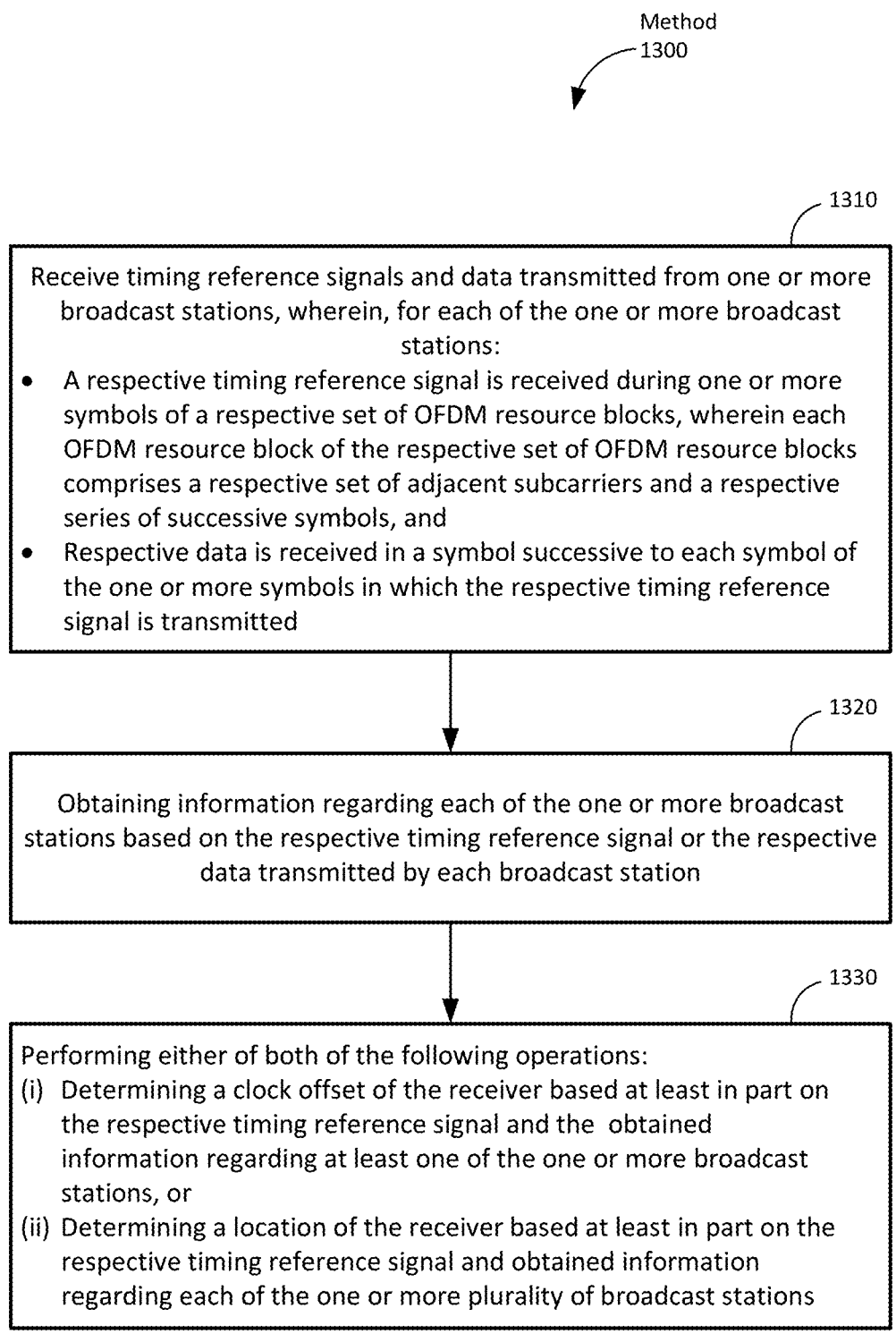
FIG. 13 is a flow diagram of a method of method of using wireless radio frequency (RF) timing reference signals at a receiver to determine a location of the receiver, according to an embodiment.

Depending on desired functionality, the broadcast station can further include one or more types of information in the data. For example, according to some embodiments, the method 1200 may further comprise including, in the data, information indicative of an identity of the broadcast station, a location of the broadcast station, or a system time of the broadcast station, or any combination thereof. A receiver can then use this information, along with the timing reference signal, to determine its location and/or determine a clock offset of the receiver from a system time of the broadcast station FIG. 13 is a flow diagram of a method 1300 of method of using wireless radio frequency (RF) timing reference signals at a receiver to, according to an embodiment. As indicated in the previously-described embodiments, these signals can be used to determine the location of the receiver and/or determine a clock offset of the receiver. FIG. 13 is provided as a non-limiting example. Alternative embodiments may include additional or alternative functions to those illustrated in the blocks shown in FIG. 13. Means for performing the functions of the blocks may comprise hardware and/or software components of a receiver 120, including components of a computer system as illustrated in FIG. 11 and previously described.

The functionality at block 1310 comprises receiving timing reference signals and data transmitted from one or more broadcast stations, wherein, for each of the one or more broadcast stations (i) a respective timing reference signal is received during one or more symbols of a respective set of Orthogonal Frequency Division Multiplexing (OFDM) resource blocks, wherein each OFDM resource block of the respective set of OFDM resource blocks comprises a respective set of adjacent subcarriers and a respective series of successive symbols, and (ii) respective data is received in a symbol successive to each symbol of the one or more symbols in which the respective timing reference signal is transmitted. Examples of a timing reference signal and respective data are described above and illustrated in FIGS. 5-8. Again, according to some embodiments, the timing reference signals and data are transmitted using a frequency band in the LF spectrum. This can include, for example, a frequency band centered at substantially 100 kHz. Means for performing the functionality at block 1310 may include a processing unit(s) 1010, bus 1005, memory 1060, low-frequency receiver 1080, and/or other components of a receiver 120, such as the components illustrated in FIG. 10 and described above.

The functionality at block 1320 comprises, obtaining information regarding each of the one or more broadcast stations based on the respective timing reference signal or the respective data transmitted by each broadcast station. As previously noted, a broadcast station may transmit timing reference signals using a code unique to the respective broadcast station within a code space for broadcast stations, thereby enabling a receiver 120 to identify the broadcast station. In some embodiments, Gold codes may be used. In a similar manner, embodiments may use codes to convey bits of information in the data. As noted, data may be encoded using Zadoff Chu codes, according some embodiments. Additionally or alternatively, data provided by a broadcast station can convey identification and/or location information regarding the broadcast station. For example, according to some embodiments, for each one of the one or more broadcast stations, the obtained information may comprise information indicative of an identity of the respective broadcast station, a location of the respective broadcast station, or a system time of the respective broadcast station, or any combination thereof. Means for performing the functionality at block 1320 may include a processing unit(s) 1010, bus 1005, memory 1060, and/or other components of a receiver 120, such as the components illustrated in FIG. 10 and described above.

The functionality at block 1330 comprises, performing either or both of the following operations (i) determining a clock offset of the receiver based at least in part on the respective timing reference signal and the obtained information regarding at least one of the one or more broadcast stations, or (ii) determining a location of the receiver based at least in part on the respective timing reference signal and obtained information regarding each of the one or more broadcast stations. For example, as described with regard to FIG. 1, if timing reference signals are received from a plurality of broadcast stations (e.g., three or more), the positioning of a receiver 120 can be determined using known differences in the timing of timing reference signals sent by pairs of broadcast stations 110, differences in the time the timing reference signals were received, and known positions of the broadcast stations 110 to trace hyperbolic curves 140 that can be used to determine distances from each broadcast station 110, and ultimately the location of the receiver 120. Known positions of broadcast stations 110 and known differences in the timing of timing reference signals sent by broadcast stations 110 may be stored in memory at the receiver 120, for example, in a database, lookup table, etc. Alternative embodiments may use timing reference signals to determine the location of the receiver 120 using different position-determination methods. For example, where the timing of reference signals broadcast by different broadcast stations 110 is known, and the receiver 120 is synchronized with broadcast stations 110, distances 130 between the receiver 120 and broadcast stations 110 can be determined directly from the time at which the receiver 120 receives the timing reference signals. In some embodiments, additional input (e.g., sensor input) can be used to resolve ambiguities in the position of the receiver 120 determined from timing reference signals. A receiver can also determine its clock offset using a timing reference signal from a single broadcast station if its location is known (or obtained using timing reference signals from multiple broadcast stations). Means for performing the functionality at block 1330 may include a processing unit(s) 1010, bus 1005, memory 1060, and/or other components of a receiver 120, such as the components illustrated in FIG. 10 and described above.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of transmitting wireless radio frequency (RF) timing reference signals from a broadcast station, the method comprising:
- transmitting a timing reference signal using one or more subcarriers during one or more symbols of a first set of Orthogonal Frequency Division Multiplexing (OFDM) resource blocks occurring at a first subframe, wherein each OFDM resource block of the first set of OFDM resource blocks comprises a set of adjacent subcarriers and a series of successive symbols; and
- for each symbol of the one or more symbols in which the timing reference signal is transmitted, transmitting data in at least one of the one or more subcarriers in a symbol successive to the respective symbol in which the timing reference signal was transmitted.

Clause 2. The method of Clause 1, wherein the timing reference signals and data are transmitted using a frequency band centered at substantially 100 kHz.

Clause 3. The method of Clauses 1 or 2, wherein the timing reference signals and data are transmitted using a comb-6 signal structure.

Clause 4. The method of any of Clauses 1-3, wherein the timing reference signals and data are transmitted such that, for each resource block of the first set of OFDM resource blocks:
- a first pair of the one or more subcarriers is used for a first plurality of successive symbols of the respective OFDM resource block, and
- a second pair of the one or more subcarriers is used for a second plurality of successive symbols of the respective OFDM resource block immediately following the first plurality of successive symbols.

Clause 5. The method of Clause 4, wherein neither subcarrier in the second pair of the one or more subcarriers is immediately adjacent to either subcarrier in the first pair of the one or more subcarriers.

Clause 6. The method of any of Clauses 1-5, wherein the timing reference signals and data are transmitted using a comb-1 signal structure, a comb-2 signal structure, or a comb-3 signal structure.

Clause 7. The method of any of Clauses 1-6, further comprising transmitting additional timing reference signals and data in a plurality of subsequent sets of OFDM resource blocks such that a muting pattern is executed to omit the transmittal of a portion of the additional timing reference signals and data during at least one set of OFDM resource blocks of the plurality of subsequent sets of OFDM resource blocks.

Clause 8. The method of any of Clauses 1-7, further comprising transmitting additional timing reference signals and data in a plurality of subsequent sets of OFDM resource blocks such that a frequency offset is implemented to offset the frequency of the transmittal of at least a portion of the additional timing reference signals and data during at least one set of OFDM resource blocks of the plurality of subsequent sets of OFDM resource blocks.

Clause 9. The method of any of Clauses 1-8, wherein the timing reference signals and data are transmitted using pi/2 BPSK, QPSK, 8-PSK, 16QAM, or 64QAM modulation, or any combination thereof.

Clause 10. The method of any of Clauses 1-9, wherein the timing reference signals and data are transmitted such that, for each resource block of the first set of OFDM resource blocks, all subcarriers of the respective OFDM resource block are used.

Clause 11. The method of any of Clauses 1-10, wherein the timing reference signals are transmitted using a code unique to the broadcast station within a code space for broadcast stations.

Clause 12. The method of any of Clauses 1-11, further comprising including, in the data, information indicative of:
- an identity of the broadcast station,
- a location of the broadcast station, or
- a system time of the broadcast station, or
- any combination thereof.

Clause 13. A method of using wireless radio frequency (RF) timing reference signals at a receiver, the method comprising:
- receiving timing reference signals and data transmitted from one or more broadcast stations, wherein, for each of the one or more broadcast stations:
  - a respective timing reference signal is received during one or more symbols of a respective set of Orthogonal Frequency Division Multiplexing (OFDM) resource blocks, wherein each OFDM resource block of the respective set of OFDM resource blocks comprises a respective set of adjacent subcarriers and a respective series of successive symbols; and
  - respective data is received in a symbol successive to each symbol of the one or more symbols in which the respective timing reference signal is transmitted;
- obtaining information regarding each of the one or more broadcast stations based on the respective timing reference signal or the respective data transmitted by each broadcast station; and
- performing either or both of the following operations:
  - (i) determining a clock offset of the receiver based at least in part on the respective timing reference signal and the obtained information regarding at least one of the one or more broadcast stations, or
  - (ii) determining a location of the receiver based at least in part on the respective timing reference signal and obtained information regarding each of the one or more broadcast stations.

Clause 14. The method of Clause 13, wherein the timing reference signals and data are transmitted using a frequency band centered at substantially 100 kHz.

Clause 15. The method of Clause 13 or 14, wherein, for each of the one or more broadcast stations, the obtained information comprises information indicative of:
- an identity of the respective broadcast station,
- a location of the respective broadcast station, or
- a system time of the respective broadcast station, or
- any combination thereof.

Clause 16. The method of any of Clauses 13-15, wherein identifying each of the one or more of broadcast stations comprises determining, for each of the one or more of broadcast stations, a code unique to the respective broadcast station within a code space for broadcast stations.

Clause 17. A broadcast station for transmitting wireless radio frequency (RF) timing reference signals, broadcast station comprising:
- a wireless communications interface;
- a memory; and
- one or more processing units communicatively coupled with the wireless communications interface and the memory, and configured to perform functions including:
  - transmitting a timing reference signal, via the wireless communications interface, using one or more subcarriers during one or more symbols of a first set of Orthogonal Frequency Division Multiplexing (OFDM) resource blocks occurring at a first subframe, wherein each OFDM resource block of the first set of OFDM resource blocks comprises a set of adjacent subcarriers and a series of successive symbols; and
  - for each symbol of the one or more symbols in which the timing reference signal is transmitted, transmitting data, via the wireless communications interface, in at least one of the one or more subcarriers in a symbol successive to the respective symbol in which the timing reference signal was transmitted.

Clause 18. The broadcast station of Clause 17, wherein the one or more processing units are configured to transmit the timing reference signals, via the wireless communications interface, and data using a frequency band centered at substantially 100 kHz.

Clause 19. The broadcast station of Clause 17 or 18, wherein the one or more processing units are configured to transmit the timing reference signals and data, via the wireless communications interface, using a comb-6 signal structure.

Clause 20. The broadcast station of any of Clauses 17-19, wherein the one or more processing units are configured to transmit the timing reference signals and data, via the wireless communications interface, such that, for each resource block of the first set of OFDM resource blocks:
- a first pair of the one or more subcarriers is used for a first plurality of successive symbols of the respective OFDM resource block, and
- a second pair of the one or more subcarriers is used for a second plurality of successive symbols of the respective OFDM resource block immediately following the first plurality of successive symbols.

Clause 21. The broadcast station of Clause 20, wherein neither subcarrier in the second pair of the one or more subcarriers is immediately adjacent to either subcarrier in the first pair of the one or more subcarriers.

Clause 22. The broadcast station of any of Clauses 17-21, wherein the one or more processing units are configured to transmit the timing reference signals and data, via the wireless communications interface, using a comb-1 signal structure, a comb-2 signal structure, or a comb-3 signal structure.

Clause 23. The broadcast station of any of Clauses 17-22, wherein the one or more processing units are further configured to transmit, via the wireless communications interface, additional timing reference signals and data in a plurality of subsequent sets of OFDM resource blocks such that a muting pattern is executed to omit the transmittal of a portion of the additional timing reference signals and data during at least one set of OFDM resource blocks of the plurality of subsequent sets of OFDM resource blocks.

Clause 24. The broadcast station of any of Clauses 17-23, wherein the one or more processing units are further configured to transmit, via the wireless communications interface, additional timing reference signals and data in a plurality of subsequent sets of OFDM resource blocks such that a frequency offset is implemented to offset the frequency of the transmittal of at least a portion of the additional timing reference signals and data during at least one set of OFDM resource blocks of the plurality of subsequent sets of OFDM resource blocks.

Clause 25. The broadcast station of any of Clauses 17-24, wherein the one or more processing units are configured to transmit the timing reference signals and data, via the wireless communications interface, using pi/2 BPSK, QPSK, 8-PSK, 16QAM, or 64QAM modulation, or any combination thereof.

Clause 26. The broadcast station of any of Clauses 17-25, wherein the one or more processing units are configured to transmit the timing reference signals and data, via the wireless communications interface, such that, for each resource block of the first set of OFDM resource blocks, all subcarriers of the respective OFDM resource block are used.

Clause 27. The broadcast station of any of Clauses 17-26, wherein the one or more processing units are configured to include, in the data, information indicative of:
- an identity of the broadcast station,
- a location of the broadcast station, or
- a system time of the broadcast station, or
- any combination thereof.

Clause 28. A receiver configured to use wireless radio frequency (RF) timing reference signals, the receiver comprising:
- a wireless communications interface;
- a memory; and
- one or more processing units communicatively coupled with the wireless communications interface and the memory, and configured to perform functions including:
  - receiving, via the wireless communications interface, timing reference signals and data transmitted from one or more broadcast stations, wherein, for each of the one or more broadcast stations:
    - a respective timing reference signal is received during one or more symbols of a respective set of Orthogonal Frequency Division Multiplexing (OFDM) resource blocks, wherein each OFDM resource block of the respective set of OFDM resource blocks comprises a respective set of adjacent subcarriers and a respective series of successive symbols; and
    - respective data is received in a symbol successive to each symbol of the one or more symbols in which the respective timing reference signal is transmitted;
  - obtaining information regarding each of the one or more broadcast stations based on the respective timing reference signal or the respective data transmitted by each broadcast station; and
  - performing either or both of the following operations:
    - (iii) determining a clock offset of the receiver based at least in part on the respective timing reference signal and the obtained information regarding at least one of the one or more broadcast stations, or (iv) determining a location of the receiver based at least in part on the respective timing reference signal and obtained information regarding each of the one or more broadcast stations.

Clause 29. The receiver of Clause 28, wherein the wireless communications interface is configured to receive the timing reference signals and data via a frequency band centered at substantially 100 kHz.

Clause 30. The receiver of Clause 28 or 29, wherein the one or more processing units are configured to determine, from the obtained information for each of the one or more broadcast stations:
an identity of the respective broadcast station,
a location of the respective broadcast station, or
a system time of the respective broadcast station, or
any combination thereof.

What is claimed is:

1. A method of transmitting wireless radio frequency (RF) timing reference signals from a broadcast station, the method comprising:
transmitting a timing reference signal using one or more subcarriers during one or more symbols of a first set of Orthogonal Frequency Division Multiplexing (OFDM) resource blocks occurring at a first subframe, wherein each OFDM resource block of the first set of OFDM resource blocks comprises a set of adjacent subcarriers and a series of successive symbols; and
for each symbol of the one or more symbols in which the timing reference signal is transmitted, transmitting data in at least one of the one or more subcarriers in a symbol directly successive to the respective symbol in which the timing reference signal was transmitted.

2. The method of claim 1, wherein the timing reference signals and data are transmitted using a frequency band centered at substantially 100 kHz.

3. The method of claim 1, wherein the timing reference signals and data are transmitted using a comb-6 signal structure.

4. The method of claim 3, wherein the timing reference signals and data are transmitted such that, for each resource block of the first set of OFDM resource blocks:
a first pair of the one or more subcarriers is used for a first plurality of successive symbols of the respective OFDM resource block, and
a second pair of the one or more subcarriers is used for a second plurality of successive symbols of the respective OFDM resource block immediately following the first plurality of successive symbols.

5. The method of claim 4, wherein neither subcarrier in the second pair of the one or more subcarriers is immediately adjacent to either subcarrier in the first pair of the one or more subcarriers.

6. The method of claim 1, wherein the timing reference signals and data are transmitted using a comb-1 signal structure, a comb-2 signal structure, or a comb-3 signal structure.

7. The method of claim 1, further comprising transmitting additional timing reference signals and data in a plurality of subsequent sets of OFDM resource blocks such that a muting pattern is executed to omit the transmittal of a portion of the additional timing reference signals and data during at least one set of OFDM resource blocks of the plurality of subsequent sets of OFDM resource blocks.

8. The method of claim 1, further comprising transmitting additional timing reference signals and data in a plurality of subsequent sets of OFDM resource blocks such that a frequency offset is implemented to offset the frequency of the transmittal of at least a portion of the additional timing reference signals and data during at least one set of OFDM resource blocks of the plurality of subsequent sets of OFDM resource blocks.

9. The method of claim 1, wherein the timing reference signals and data are transmitted using pi/2 BPSK, QPSK, 8-PSK, 16QAM, or 64QAM modulation, or any combination thereof.

10. The method of claim 1, wherein the timing reference signals and data are transmitted such that, for each resource block of the first set of OFDM resource blocks, all subcarriers of the respective OFDM resource block are used.

11. The method of claim 1, wherein the timing reference signals are transmitted using a code unique to the broadcast station within a code space for broadcast stations.

12. The method of claim 1, further comprising including, in the data, information indicative of:
an identity of the broadcast station,
a location of the broadcast station, or
a system time of the broadcast station, or
any combination thereof.

13. A method of using wireless radio frequency (RF) timing reference signals at a receiver, the method comprising:
receiving timing reference signals and data transmitted from one or more broadcast stations, wherein, for each of the one or more broadcast stations:
a respective timing reference signal is received during one or more symbols of a respective set of Orthogonal Frequency Division Multiplexing (OFDM) resource blocks, wherein each OFDM resource block of the respective set of OFDM resource blocks comprises a respective set of adjacent subcarriers and a respective series of successive symbols; and
respective data is received in a symbol directly successive to each symbol of the one or more symbols in which the respective timing reference signal is transmitted;
obtaining information regarding each of the one or more broadcast stations based on the respective timing reference signal or the respective data transmitted by each broadcast station; and
performing either or both of the following operations:
(i) determining a clock offset of the receiver based at least in part on the respective timing reference signal and the obtained information regarding at least one of the one or more broadcast stations, or
(ii) determining a location of the receiver based at least in part on the respective timing reference signal and obtained information regarding each of the one or more broadcast stations.

14. The method of claim 13, wherein the timing reference signals and data are transmitted using a frequency band centered at substantially 100 kHz.

15. The method of claim 13, wherein, for each of the one or more broadcast stations, the obtained information comprises information indicative of:
an identity of the respective broadcast station,
a location of the respective broadcast station, or
a system time of the respective broadcast station, or
any combination thereof.

16. The method of claim 13, wherein identifying each of the one or more broadcast stations comprises determining, for each of the one or more of broadcast stations, a code unique to the respective broadcast station within a code space for broadcast stations.

17. A broadcast station for transmitting wireless radio frequency (RF) timing reference signals, broadcast station comprising:
- a wireless communications interface;
- a memory; and
- one or more processing units communicatively coupled with the wireless communications interface and the memory, and configured to perform functions including:
  - transmitting a timing reference signal, via the wireless communications interface, using one or more subcarriers during one or more symbols of a first set of Orthogonal Frequency Division Multiplexing (OFDM) resource blocks occurring at a first subframe, wherein each OFDM resource block of the first set of OFDM resource blocks comprises a set of adjacent subcarriers and a series of successive symbols; and
  - for each symbol of the one or more symbols in which the timing reference signal is transmitted, transmitting data, via the wireless communications interface, in at least one of the one or more subcarriers in a symbol directly successive to the respective symbol in which the timing reference signal was transmitted.

18. The broadcast station of claim 17, wherein the one or more processing units are configured to transmit the timing reference signals, via the wireless communications interface, and data using a frequency band centered at substantially 100 kHz.

19. The broadcast station of claim 17, wherein the one or more processing units are configured to transmit the timing reference signals and data, via the wireless communications interface, using a comb-6 signal structure.

20. The broadcast station of claim 19, wherein the one or more processing units are configured to transmit the timing reference signals and data, via the wireless communications interface, such that, for each resource block of the first set of OFDM resource blocks:
- a first pair of the one or more subcarriers is used for a first plurality of successive symbols of the respective OFDM resource block, and
- a second pair of the one or more subcarriers is used for a second plurality of successive symbols of the respective OFDM resource block immediately following the first plurality of successive symbols.

21. The broadcast station of claim 20, wherein neither subcarrier in the second pair of the one or more subcarriers is immediately adjacent to either subcarrier in the first pair of the one or more subcarriers.

22. The broadcast station of claim 17, wherein the one or more processing units are configured to transmit the timing reference signals and data, via the wireless communications interface, using a comb-1 signal structure, a comb-2 signal structure, or a comb-3 signal structure.

23. The broadcast station of claim 17, wherein the one or more processing units are further configured to transmit, via the wireless communications interface, additional timing reference signals and data in a plurality of subsequent sets of OFDM resource blocks such that a muting pattern is executed to omit the transmittal of a portion of the additional timing reference signals and data during at least one set of OFDM resource blocks of the plurality of subsequent sets of OFDM resource blocks.

24. The broadcast station of claim 17, wherein the one or more processing units are further configured to transmit, via the wireless communications interface, additional timing reference signals and data in a plurality of subsequent sets of OFDM resource blocks such that a frequency offset is implemented to offset the frequency of the transmittal of at least a portion of the additional timing reference signals and data during at least one set of OFDM resource blocks of the plurality of subsequent sets of OFDM resource blocks.

25. The broadcast station of claim 17, wherein the one or more processing units are configured to transmit the timing reference signals and data, via the wireless communications interface, using pi/2 BPSK, QPSK, 8-PSK, 16QAM, or 64QAM modulation, or any combination thereof.

26. The broadcast station of claim 17, wherein the one or more processing units are configured to transmit the timing reference signals and data, via the wireless communications interface, such that, for each resource block of the first set of OFDM resource blocks, all subcarriers of the respective OFDM resource block are used.

27. The broadcast station of claim 17, wherein the one or more processing units are configured to include, in the data, information indicative of:
- an identity of the broadcast station,
- a location of the broadcast station, or
- a system time of the broadcast station, or
- any combination thereof.

28. A receiver configured to use wireless radio frequency (RF) timing reference signals, the receiver comprising:
- a wireless communications interface;
- a memory; and
- one or more processing units communicatively coupled with the wireless communications interface and the memory, and configured to perform functions including:
  - receiving, via the wireless communications interface, timing reference signals and data transmitted from one or more broadcast stations, wherein, for each of the one or more broadcast stations:
    - a respective timing reference signal is received during one or more symbols of a respective set of Orthogonal Frequency Division Multiplexing (OFDM) resource blocks, wherein each OFDM resource block of the respective set of OFDM resource blocks comprises a respective set of adjacent subcarriers and a respective series of successive symbols; and
    - respective data is received in a symbol directly successive to each symbol of the one or more symbols in which the respective timing reference signal is transmitted;
  - obtaining information regarding each of the one or more broadcast stations based on the respective timing reference signal or the respective data transmitted by each broadcast station; and
  - performing either or both of the following operations:
    - (iii) determining a clock offset of the receiver based at least in part on the respective timing reference signal and the obtained information regarding at least one of the one or more broadcast stations, or
    - (iv) determining a location of the receiver based at least in part on the respective timing reference signal and obtained information regarding each of the one or more broadcast stations.

29. The receiver of claim 28, wherein the wireless communications interface is configured to receive the timing reference signals and data via a frequency band centered at substantially 100 kHz.

30. The receiver of claim 28, wherein the one or more processing units are configured to determine, from the obtained information for each of the one or more broadcast stations:
    an identity of the respective broadcast station,
    a location of the respective broadcast station, or
    a system time of the respective broadcast station, or any combination thereof.

\* \* \* \* \*